US008166406B1

(12) United States Patent
Goldfeder et al.

(10) Patent No.: US 8,166,406 B1
(45) Date of Patent: Apr. 24, 2012

(54) INTERNET PRIVACY USER INTERFACE

(75) Inventors: Aaron Goldfeder, Seattle, WA (US); Cem Paya, Seattle, WA (US); Joseph J. Gallagher, Seattle, WA (US); Roberto A. Franco, Seattle, WA (US); Stephen J. Purpura, Kirkland, WA (US); Darren Mitchell, Woodinville, WA (US); Frank M. Schwieterman, Seattle, WA (US); Viresh Ramdatmisier, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/187,389

(22) Filed: Jun. 28, 2002

Related U.S. Application Data

(60) Provisional application No. 60/337,376, filed on Dec. 4, 2001.

(51) Int. Cl.
*G06F 3/00* (2006.01)
(52) U.S. Cl. ........ 715/745; 715/741; 715/744; 715/747; 709/224
(58) Field of Classification Search .......... 709/224; 707/102; 715/741, 747, 742, 745
See application file for complete search history.

(56) References Cited

U.S. PATENT DOCUMENTS

| | | | | |
|---|---|---|---|---|
| 4,954,951 | A | * | 9/1990 | Hyatt ........................ 711/218 |
| 6,006,260 | A | * | 12/1999 | Barrick et al. ............. 709/224 |
| 6,489,968 | B1 | | 12/2002 | Ortega et al. |
| 6,507,349 | B1 | | 1/2003 | Balassanian |
| 6,515,681 | B1 | | 2/2003 | Knight |
| 6,597,377 | B1 | | 7/2003 | MacPhail |
| 6,732,102 | B1 | | 5/2004 | Khandekar |
| 6,766,458 | B1 | | 7/2004 | Harris et al. |
| 6,829,619 | B1 | | 12/2004 | Wakamatsu et al. |
| 6,874,084 | B1 | | 3/2005 | Dobner et al. |
| 7,137,009 | B1 | * | 11/2006 | Gordon et al. .............. 713/185 |
| 7,676,575 | B2 | * | 3/2010 | Yamada et al. ............. 709/225 |
| 7,865,830 | B2 | | 1/2011 | Kim et al. |
| 2002/0104015 | A1 | * | 8/2002 | Barzilai et al. ............. 713/201 |
| 2002/0124172 | A1 | | 9/2002 | Manahan |
| 2002/0133720 | A1 | * | 9/2002 | Sherman et al. ............ 713/201 |
| 2002/0184491 | A1 | | 12/2002 | Morgan et al. |

(Continued)

FOREIGN PATENT DOCUMENTS

GB 2364408 A * 1/2002

OTHER PUBLICATIONS

Melissa J. Perenson, "Crush Those Cookies, or Just Manage Them", Mar. 17 2000, PCWorld.com http://www.pcworld.com/reviews/article/0,aid,15771,00.asp.*

(Continued)

*Primary Examiner* — Alvin Tan

(57) ABSTRACT

A method and system that provide an intuitive user interface and related components for making Internet users aware of Internet cookie-related privacy issues, and enabling users to control Internet privacy through automatic cookie handling. Default privacy settings for handling cookies are provided, and through the user interface, the privacy settings may be customized to a user's liking. Further, through the user interface, for each individual site that forms a page of content, the site's privacy policy may be reviewed and/or the privacy controlled by specifying how cookies from that site are to be handled. To make users aware, the user interface provides an active alert on a first instance of a retrieved web site's content that fails to include satisfactory privacy information, and thereafter, provides a distinctive passive alert to allow the user selective access to privacy information, per-site cookie handling and cookie handling settings.

14 Claims, 18 Drawing Sheets

U.S. PATENT DOCUMENTS

| | | |
|---|---|---|
| 2003/0028762 A1 | 2/2003 | Trilli et al. |
| 2003/0050995 A1 | 3/2003 | Mateos |
| 2003/0101412 A1 | 5/2003 | Eid |
| 2003/0137538 A1 | 7/2003 | Hesmer et al. |
| 2003/0177501 A1 | 9/2003 | Takahashi et al. |
| 2004/0003097 A1 | 1/2004 | Willis et al. |
| 2004/0177383 A1 | 9/2004 | Martinolich et al. |
| 2004/0210824 A1 | 10/2004 | Shoff et al. |
| 2005/0015452 A1 | 1/2005 | Corson |
| 2005/0268100 A1 | 12/2005 | Gasparini et al. |
| 2006/0053293 A1 | 3/2006 | Zager et al. |
| 2006/0218403 A1 | 9/2006 | Sauve et al. |
| 2007/0016609 A1 | 1/2007 | Kim et al. |

OTHER PUBLICATIONS

Cookie Crusher, Cookie Crusher Tour, Nov. 9 2000, The Limit Software Inc., http://web.archive.org/web/20001109033100/www.thelimitsoft.com/cookie/tour/tour2.html.*

Gordon Padwick, Helen Bell Feddema, "Using Microsoft Outlook 2000", Copyright 1999, Que, pp. 947-948.*

Koch et al., "Platform for Privacy Preferences Project Present and Future", 6.805 Ethics and Law on the Electronic Frontier, May 17, 2001, pp. 24, 41-47, 58-61.*

Microsoft Corporation, "Microsoft Internet Explorer 5 Resource Kit", Jan. 19 2000, Microsoft Press, Sections—Setting Up Security Zones, Simplifying Web Tasks, Identifying Migration and Compatibility Issues.*

Jill T. Freeze, "Sams Teach Yourself Microsoft Internet Explorer 5 in 10 Minutes", Copyright 1999, Sams Publishing, pp. 70-73.*

Deirdre Mulligan et al, "P3P and Privacy: An Update for the Privacy Community" by the Center for Democracy and Technology, Mar. 28, 2000.*

Alwang, Cookie Managers, Jan. 16, 2001, Ziff Davis Media Inc., http://www.pcmag.com/print_article2/0,1217,a=12703,00.asp.*

Edwards, "Microsoft Releases Internet Explorer Advanced Security Privacy Beta", Sep. 9, 2000, Penton Media Inc., InstantDoc #15502, Retrieved from http://windowsitpro.com/articles/print.cfm?articleid=15502.*

Purcell, "Microsoft Announces New Cookie-Management Features to Help Consumers Protect Privacy Online", Jul. 20, 2000, Microsoft Corporation, Retrieved from http://www.microsoft.com/presspass/features/2000/jul00/07-20cookies.mspx?pf=true.*

Cookie Central, "Version 4 Update", Nov. 9, 2000, Cookie Central, Available http://web.archive.org/web/20001109095200/www.cookiecentral.com/version4.htm.*

Netscape, "Persistent Client State HTTP Cookies", Nov. 9, 2000, Netscape, Available http://web.archive.org/web/20001109063700/www.netscape.com/newsref/std/cookie_spec.html.*

Koch et al., "Platform for Privacy Preferences Project Present and Future", 6.805 Ethics and Law on the Electronic Frontier, May 17, 2001, pp. 1-71.*

Hetherington et al. (U.S. Appl. No. 09/461,507) Dec. 14, 1999.*

Bowman, Barb, "Internet Explorer 6: Its All in There," Jun. 25, 2001, Microsoft Corporation, Available at http://www.microsoft.com/windowsxp/using/networking/expert/bowman_june25.mspx.*

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

Ncipher Inc., "Protecting commercial secure web servers from key-finding treats", www.ncipher.com/uploads/resources/pcws.pdf, white paper,(1999).

"flaggeditems.png", *Print screen from Internet Search*, Retreived from <http://web.archive.org/web/20050623095655/http://ranchero.com/images/nnw2/flaggeditems.png> on Nov. 13, 2008, 1 page.

"Ranchero Software: What's New in NetNewsWire 2.0" *Web article*, retrieved from <http://web.archive.org/web/20050618014501/http://ranchero.com/netnewswire/whatsnew/netnewswire20.php> on Nov. 13, 2008,pp. 1-3.

"syncing.png", *Print Screen from article*, retrieved from <http://web.archive.org/web/20050623095327/http://ranchero.com/images/nnw2/syncing.png> on Nov. 13, 2008, 1 page.

"Ranchero Software Search Engine Subscriptions", *On-line Article*, Retrieved from <http://web.archive.org/web/20050714082710/http://ranchero.com/netnewswire/features/searchEngineSubscrptions.php> on Nov. 13, 2008,pp. 1-2.

"SearchFeed.png", *Print Screen in article*, Retrieved from <http://web.archive.org/web/20050623095831/http://ranchero.com/images/nnw2/searchFeed.png> on Nov. 13, 2008, 1 page.

"Searching.png", *Print Screen from article*, Retrieved from <http://web.archive.org/web/20050623095422/http://ranchero.com/images/nnw2/searching.png> on Nov. 13, 2008,1 page.

"Ranchero Software_Smart Lists", *Internet Article*, Retrieved from <http://web.archive.org/web/20050602084724/http://ranchero.com/netnewswire/features/smartLists.php> on Nov. 13, 2008,pp. 1-2.

"smartList.png", *Print Screen from Internet Article*, Retrieved from <http://web.archive.org/web/20050623095628/http://ranchero.com/images/nnw2/smartList.png> on Nov. 13, 2008,1 page.

"Ranchero Software_Flagged Items", *Internet Article*, Retrieved from <http://web.archive.org/web/20050612083011/http://ranchero.com/netnewswire/features/flaggedItems.php> on Nov. 13, 2008,1 page.

"Rancho Software_Features Chart", *Internet Article*, Retrieved from <http://web.archive.org/web/20050609010027/http://ranchero.com/netnewswire/featureschart20.php> on Nov. 13, 2008,pp. 1-3.

"Persistence.png", *Print Screen from Internet Article*, Retrieved from <http://web.archive.org/web/20050623095937/http://ranchero.com/images/nnw2/persistence.png> on Nov. 13, 2008,1 page.

"Ranchero Software_Subscription Sharing", *Internet Article*, Retrieved from <http://web.archive.org/web/20050811083741/http://ranchero.com/netnewswire/features/sharing.php> on Nov. 13, 2008,pp. 1-3.

"mainWindow2.png" *Print Screen from Internet Article*, Retrieved from <http://web.archive.org/web/20050623095300/http://ranchero.com/images/nnw2/mainWindow2.png> on Nov. 13, 2008,1 page.

"Ranchero Software_NetNewsWire", *Internet Article*, Retrieved from <http://web.archive.org/web/20051003204517/ranchero.com/netnewswire/> on Nov. 13, 2008,pp. 1-5.

"Search Engine Subscriptions", *Internet Article*, Retrieved from <http://web.archive.org/web/20051217013212/http://ranchero.com/netnewswire/helpBook/searchEngineSubs.html> on Nov. 13, 2008,1 page.

"Syncing", *Internet Article*, Retrieved from <http://web.archive.org/web/20051217023557/http://ranchero.com/netnewswire/helpBook/syncing.html> on Nov. 13, 2008,pp. 1-2.

"Subscribing and Unsubscribing", *Internet Article*, Retrieved from <http://web.archive.org/web/20060915152527/http://ranchero.com/netnewswire/helpBook/subUnsub.html> on Nov. 13, 2008,pp. 1-2.

"Ranchero Software_NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008,pp. 1-3.

"Yahoo! Search Services and Tools", *Internet Search Screen*, Retrieved from <http://web.archive.org/web/20051001065344/http://search.yahoo.com/mrss/submit> on Nov. 13, 2008,1 page.

"Yahoo! Publishers Guide to RSS : Submit your RSS Feed" *Internet Article*, Retrieved from <http://web.archive.org/web/20051216153612/http://uk.promotions.yahoo.com/publisher/submit.html> on Nov. 13, 2008,pp. 1-3.

"Blogdigger—Add Feed Form", *Internet Resource*, Retrieved from <http://web.archive.org/web/20050618015745/http://www.blogdiggercom/add.jsp > on Nov. 13, 2008 1 of> on Nov. 13, 2008,1 page.

"RSS Submissions", *Internet Article*, Retrieved from <http://web.archive.org/web/20050619014308/http://www.rss-specifications.com/rss-submission.htm> on Nov. 13, 2008,pp. 1-3.

"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008,pp. 1-3.

"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008, pp. 1-4.

"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008, pp. 1-3.

"Syndic8.com—Documents1", *Internet Article*, Retrieved from <http://web.archive.org/web/20050513214756/http://www.syndic8.com/documents/howto/> on Nov. 13, 2008, pp. 1-3.

"Syndic8.com—Documents2", *Internet Article*, Retrieved from <http://web.archive.org/web/20050622035505/http://www.syndic8.com/documents/howto/> on Nov. 13, 2008, pp. 1-3.

"Syndic8.com—HowToUse", *Internet Article*, Retrieved from <http://web.archive.org/web/20050619233841/http://www.syndic8.com/howto.php > on Nov. 13, 2008, pp. 1-4.

"Kalsey_Blogfeed" *Internet Article*, Retrieved from <http://web.archive.org/web/20050515005125/http://www.kalsey.com/tools/blogfeed/> on Nov. 13, 2008, pp. 1-3.

"Feed Splicing, Part 1", *Retrieved from*: "http://blogs.feedburner.com/feedburner/archives/2004/07/feed_splicing_part_i.php", (Jul. 14, 2004), 5 Pages.

"Introduction to RSS", *Retrieved from*: "http://www/webreference.com/authoring/languages/xml/rss/intro.", 3 Pages, Apr. 14, 2003.

"Feed Splicing, Part 2", *Retrieved from*: "http://blogs.feedburner.com/feedburner/archives/2004/08feed_splicing_part_ii.php", The Feed Thickens.http://blog.flicker.net/en/2007/14/the-feed-thickens., 5 Pages, Aug. 16, 2004.

"Non Final Office Action", U.S. Appl. No. 11/179,149, (Mar. 9, 2009), 30 pages.

"Final Office Action", U.S. Appl. No. 11/179,149, (Oct. 2, 2009), 16 pages.

Verisign Inc., "Licensing verisign certificates: securing multiple web server and domain configurations", www.msctrustgate.com/pdf/licensing.pdf, white paper,(Nov. 2, 2001), 15 pages.

"Feed Burner", *Retrieved from*: "http://www.feedburner.com.", (Feb. 25, 2004), 1 Page.

"Non-Final Office Action", U.S. Appl. No. 11/179,149, (Jan. 25, 2010), 15 pages.

"PCT Search Report and Written Opinion", U.S. Appl. No. PCT/US06/26855, (Aug. 5, 2008), 10 pages.

"Final Office Action", U.S. Appl. No. 11/179,149, (Jun. 24, 2010), 9 pages.

"Extended EP Search Report", European Patent Application No. 06786267.2, (May 21, 2010), 5 pages.

"Corrected Notice of Allowance", U.S. Appl. No. 11/179,149, (Dec. 9, 2010), 6 pages.

"Foreign Office Action", Chinese Application No. 200680024442.3, (Oct. 20, 2010), 9 pages.

"Notice of Allowance", U.S. Appl. No. 11/179,149, (Aug. 25, 2010), 7 pages.

"Supplemental Notice of Allowance", U.S. Appl. No. 11/179,149, (Oct. 6, 2010), 5 pages.

* cited by examiner

INTERNET PRIVACY USER INTERFACE

CROSS-REFERENCE TO RELATED APPLICATIONS

The present invention claims priority to U.S. Provisional Patent Application Ser. No. 60/337,376, filed Dec. 4, 2001. The present invention is related to copending U.S. patent applications entitled "System and Method Facilitating Contextual and/or Downgraded Cookies," Ser. No. 09/998,702 and "Method and System for Protecting Internet Users' Privacy by Evaluating Web Site Platform for Privacy Preferences Policy, Ser. No. 09/999,175, both of which were filed on Nov. 30, 2001, assigned to the same assignee as the present application, and are hereby incorporated by reference in their entireties.

FIELD OF THE INVENTION

The invention relates generally to computer systems and the Internet, and more particularly to Internet privacy.

BACKGROUND OF THE INVENTION

The Internet, which in essence includes a large number of networked computers distributed throughout the world, has become an extremely popular source of virtually all kinds of information. Increasingly sophisticated computers, software, and networking technology have made Internet access relatively straightforward for end users. For example, conventional browser software allows a user to request information such as a web page from a web site on one or more remote computers. To this end, the user provides the address of the web page (e.g., a uniform resource identifier, or URI) in some manner to the browser software, and the browser software transmits the request using a well known communication protocol such as the HyperText Transport Protocol (HTTP). The request is then routed to the destination computer or web site based on the address.

When the request is received, the remote web site evaluates the request and returns an appropriate response, which may include the information requested in some formatted content, e.g., a HyperText Markup Language (HTML) format. The browser software parses and interprets the returned content to render a page or the like upon the user's computer display.

When accessed, some web sites attempt to store information on the user's computer, in a small text file referred to as a cookie. Many times this is desirable to the user, e.g., so that the user does not have to repeatedly resubmit information manually to the remote computer hosting the web site, but instead can automatically provide the information as stored in the cookie. For example, a user can allow cookies to be stored on his or her computer so as to be able to view some web sites, and/or to take advantage of desirable customization features, such as local news and weather, or stock quotes. Such a cookie is likely a persistent cookie, which remains on the user's computer when the browsing software is closed, so that the cookie can be read by the web site that created it when that site is later revisited. Alternatively, a temporary or session cookie may be stored on a user's computer only for the current browsing session. Such a cookie is deleted from the computer when the browsing software is closed.

While some cookies are thus valuable to users, other cookies allow abuse of the user's privacy, essentially by allowing access to personally identifiable information that may be used for a secondary purpose, without the user's consent or knowledge. For example, less-than-trustworthy web sites can invade a user's privacy by tracking the web sites that the user has visited. Such a site may do this by storing a cookie on the user's machine, and then having advertisements or the like embedded in other web sites. When such other web sites are visited, the embedded web site can retrieve its cookie and thereby obtain information indicating that the user visited the specific site. Over time, this information may be collected and analyzed to profile a user's web surfing habits across a set of web sites. Such information may be used for many purposes, even though a user would not want that information known. For example, the information may be used for targeted advertising, resold to others, and so forth.

In sum, cookies are widely used in data collection, but simply disabling cookies is impractical because many users benefit from legitimate ones upon which applications depend. A solution such as prompting the user before allowing any cookie storage (or recall) is generally undesirable because such prompting interrupts and annoys many users. At the same time, however, many web users are increasingly concerned that web sites can use cookies or the like to locate them in the physical world, profile them in the virtual world, and/or correlate this information to obtain an essentially complete user identity picture. Many web users also express concerns over web sites sharing their personal data with other parties, such as for online behavior analysis. Still further, many other users are unaware of such data collection practices, or at least the extent of it and the specific details being collected, and thus are uncertain as to what actions can be taken to counter such activity and reasonably protect personal privacy.

SUMMARY OF THE INVENTION

Briefly, the present invention provides a method and system embodied in a user interface and related components for making users aware of privacy issues, while further enabling users to control privacy settings to a desired extent. The present invention also provides default privacy settings to protect the privacy of non-sophisticated users and/or users unaware of Internet privacy issues. Moreover, the privacy policy may be reviewed and/or controlled for each individual site that makes up a page of content.

In general, one aspect of the present invention makes users aware of privacy issues by automatically providing an active alert (such as a pop-up dialog box) on a first instance of a retrieved web site's content that fails to include satisfactory privacy information. Thereafter, subsequent instances of missing or unsatisfactory privacy information from a web site result in a distinctive passive alert, such as in the form of a displayed icon in a window of the browser that renders the content.

The browser interprets privacy settings to block the storage and/or retrieval of cookies for sites that may otherwise share data without user permission, or for sites that do not provide privacy information and thus are capable of sharing such data. Default privacy settings are provided, which can then be individually customized, or more simply adjusted to various privacy levels via a simple privacy settings slider control. Privacy settings may also be imported from a customized privacy settings file or the like.

The user interface, as incorporated into the browser code, also enables the display of the various web sites that make up a given page of content, which can be all of the sites, or those that are unsatisfactory with respect to privacy and thus restricted. A site's privacy policy may be made available in accordance with a Platform for Privacy Preferences (P3P) standard, and if available, the privacy policy of a web site may be displayed in a verbose form, retrieved in XML form, and rendered in a human readable form.

Other advantages will become apparent from the following detailed description when taken in conjunction with the drawings, in which:

DETAILED DESCRIPTION

Exemplary Operating Environment

Figure 1:
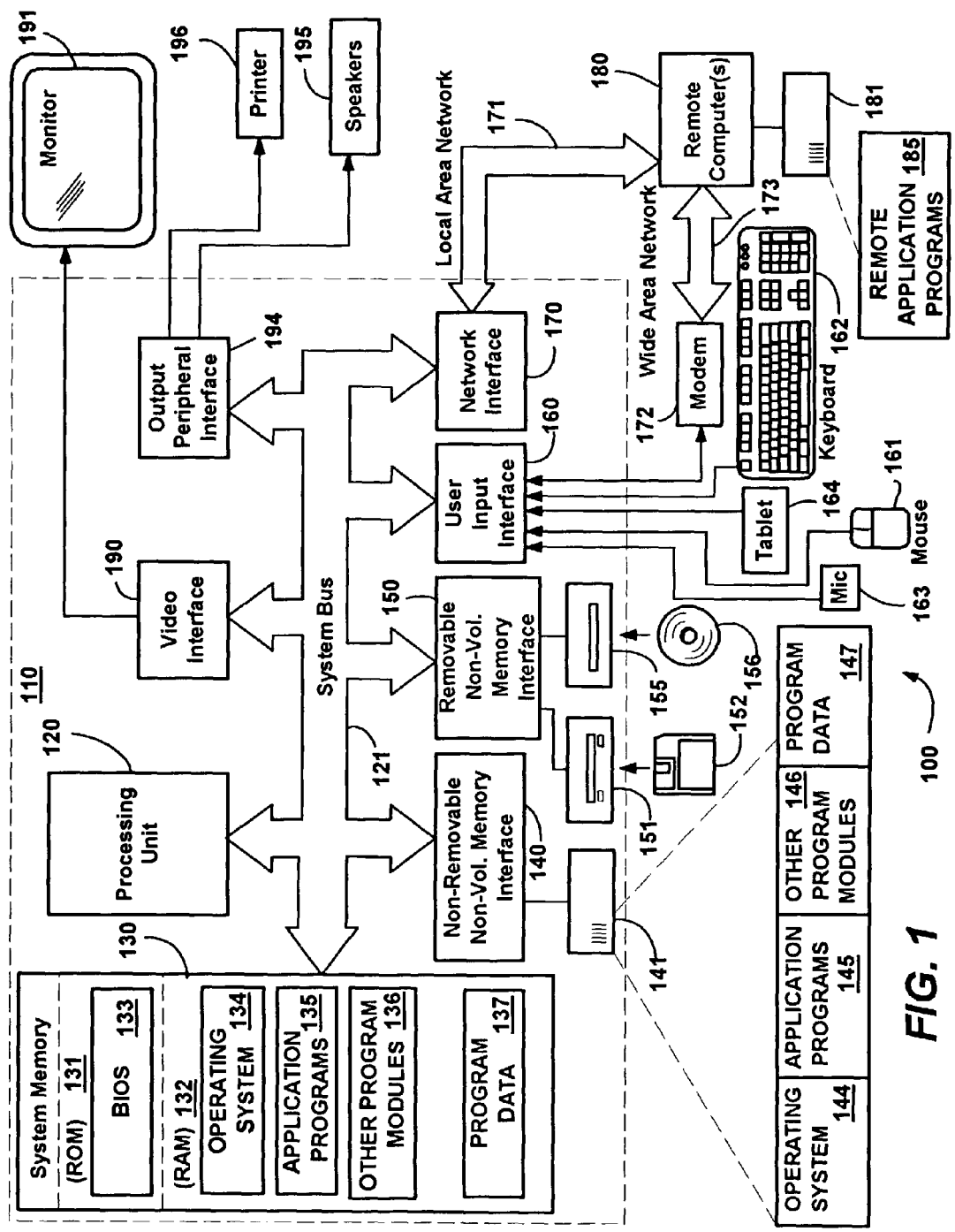
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Internet Privacy Control

One aspect of the present invention is generally directed to the concept of cookies, which typically comprise small text files written by web sites to a machine that is requesting content from those sites. There are various types (properties and/or contexts) of cookies, and as will be described below, privacy-related decisions may be made based on various criteria, including the cookie types. Examples of various types of cookies are set forth herein, and also can be found in the related copending U.S. patent application Ser. No. 09/998,702 entitled "System and Method Facilitating Contextual and/or Downgraded Cookies," which is hereby incorporated by reference herein in its entirety.

For example, cookies can either be persistent or temporary. A persistent cookie is a cookie stored on a computer as a file that remains there after the browsing session is completed, e.g., when the browser code is closed. A persistent cookie can be read by the web site that created it when that site is visited again. A session cookie is temporarily stored, only for the current browsing session, and is deleted from the computer when the browser software instance is closed.

Another criterion for a cookie is whether that cookie is a first party or third party cookie, depending on how the site providing the cookie relates to the site to which the user has navigated. A first-party cookie either originates on or is sent to the web site that a user is currently viewing. Such first party cookies are commonly used to store information, such as the user's preferences when visiting that site. A third-party cookie either originates on or is sent to a web site different from the one the user is currently viewing. Third-party web sites typically provide some of the content on the Web site that a user is viewing. For example, many sites use advertising from third-party web sites, and those third-party web sites may use cookies. A common use for this type of cookie is to track web page usage for advertising or other marketing purposes. First-party and/or third-party cookies can be persistent or temporary.

These various cookie-related concepts are described in more detail below with respect to their usage in controlling privacy. Notwithstanding, it will be appreciated that the present invention is not limited to cookie files as conventionally understood, or any other type of cookie data, but rather contemplates virtually any information in any form that one computer can use with respect to another computer. Thus, as used herein, the term "cookie," "cookie data", "cookie file" and the like represent such information, regardless of how it is identified, formatted, provided, maintained, and so on.

Figure 2:
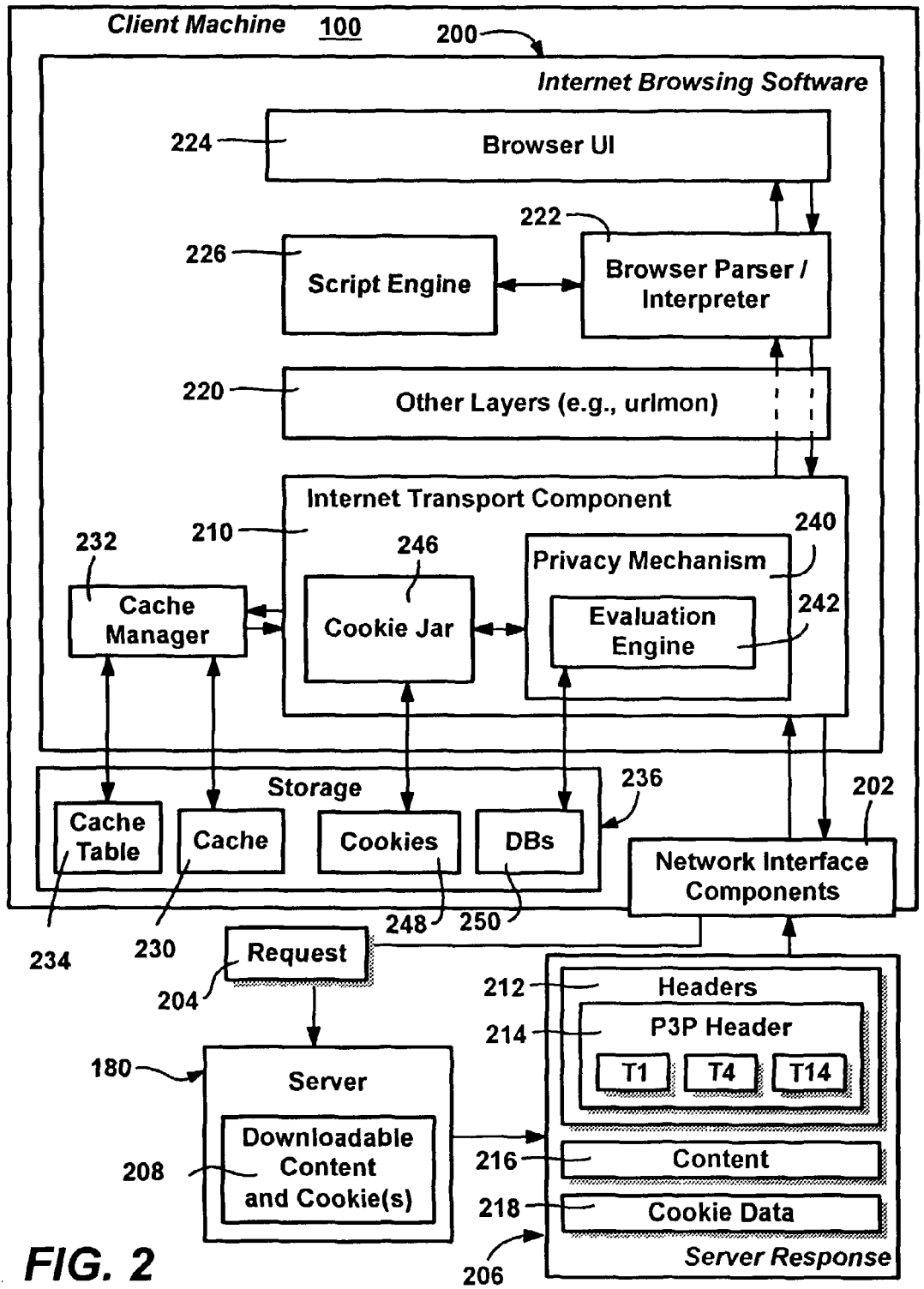
FIG. 2 is a block diagram generally representing various components for evaluating privacy.

FIG. 2 shows a generalized conceptual model of browsing software 200 executing in a client machine (e.g., the computer system 110 of FIG. 1) that communicates via a network interface software and hardware 202 with a remote server (e.g., one of the remote computer(s) 180 of FIG. 1). The communication may include requests for content or the like (e.g., HTTP "GET" requests) such as the request 204, and result in responses such as the response 206 being received from the server 180. Communication between the client 110 and the server 180 typically uses a well-known network protocol, such as hypertext transfer protocol (HTTP). As used herein, "server" or "network server" includes any machine or combination of machines having content and (in keeping with an aspect of the present invention as described below) cookies maintained thereon or in association therewith, shown in FIG. 2 as the block labeled 208. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

As further represented in FIG. 2, an internet transport component 210 (e.g., wininet.dll) handles much of the processing of the response 206. Part of the response 206 comprises headers 212, which may include a Platform for Privacy Preferences (P3P) header 214, such as formatted in accordance with a P3P header standard as published (e.g., accessible via http://www.w3.org) by the World Wide Web Consortium (W3C®). As is known, many web sites provide privacy statements as written documents that can be viewed. Web sites also may provide P3P privacy policy data.

To this end, in one implementation generally represented in FIG. 2, the P3P header 214 includes compact policy data, e.g., in the form of a string that may include some number of tokens that represent a web site's privacy policy data in a compact form. In FIG. 2, arbitrarily labeled tokens. T1, T4 and T14 are shown. As also represented in FIG. 2, the server response 206 may include the requested content 216 and/or cookie (data) 218.

When content 216 is returned, the content is passed from the internet transport component 210 (possibly though other layers of code 220) to browser parser/interpreter code 222 that parses and interprets the content for displaying to the user via a browser user interface 224. The browser parser/interpreter code 222 may invoke a script engine 226 as needed to interpret any script embedded in or referenced by the content.

Similar content also may be stored in a local cache 230 accessed via a cache manager 232 that is included in or otherwise associated with the internet transport component 210. For example, the cache manager component 232 manages the cache by maintaining site-to-local-file mappings in a cache table 234 or the like, such that the content and related data may be locally accessed as appropriate. Note that although FIG. 2 shows a single storage unit 236 (e.g., the hard disk drive 141 of FIG. 1) as maintaining the various data, as is understood the data may be maintained in and/or distributed among separate storage units.

To enforce a user's privacy settings relative to the policy data received from the web site, the internet transport component 210 includes or is otherwise associated with a (logical) privacy mechanism 240 that includes an evaluation engine 242 which, in general, determines whether a cookie operation will be allowed to be performed (and if so, to what extent) by a cookie storage mechanism, referred to as a cookie jar 246. To this end, when invoked, such as when called by the cookie jar 246, the evaluation engine 242 evaluates any privacy policies (e.g., as present in the compact policy in the P3P header 214) provided by a web site to determine whether that site is permitted to persist, retrieve (referred to as replay) or delete its cookie data 218 in the set of cookies 248 on the machine 110. As described below, this determination is done by considering properties of the cookie and the context in which it is being used, along with the privacy policy specified by the web site, and comparing this information to the users' privacy preferences and other specified information as maintained in privacy-related information stores, shown in FIG. 2 as databases 250. In general, any of the criteria that are available to the evaluation engine 242, regardless of how obtained or determined, may be used in the evaluation and determination process. Such "available criteria" include, for example and without limitation, cookie-related properties or contexts, per-site data, security settings, (e.g., zone data), privacy settings/preferences/rules, the absence of valid and/or relevant site-provided policy data, how the cookie action is being requested, (e.g., script or tag), and so forth.

Note that as described below, the determination may be an automatic allow or deny, or require user input via a prompt. A determination may also downgrade a cookie from a persistent cookie to a session cookie, and/or leash a cookie, which means that a cookie may be stored, but will not be allowed to be replayed in a third party context. Note that replay of a cookie is dependent on whether it was leashed or not at cookie set time. If the cookie was leashed and the current request is a third party request, the cookie is suppressed. Flags or the like may be maintained in association with the cookie to preserve these states.

Figure 3:
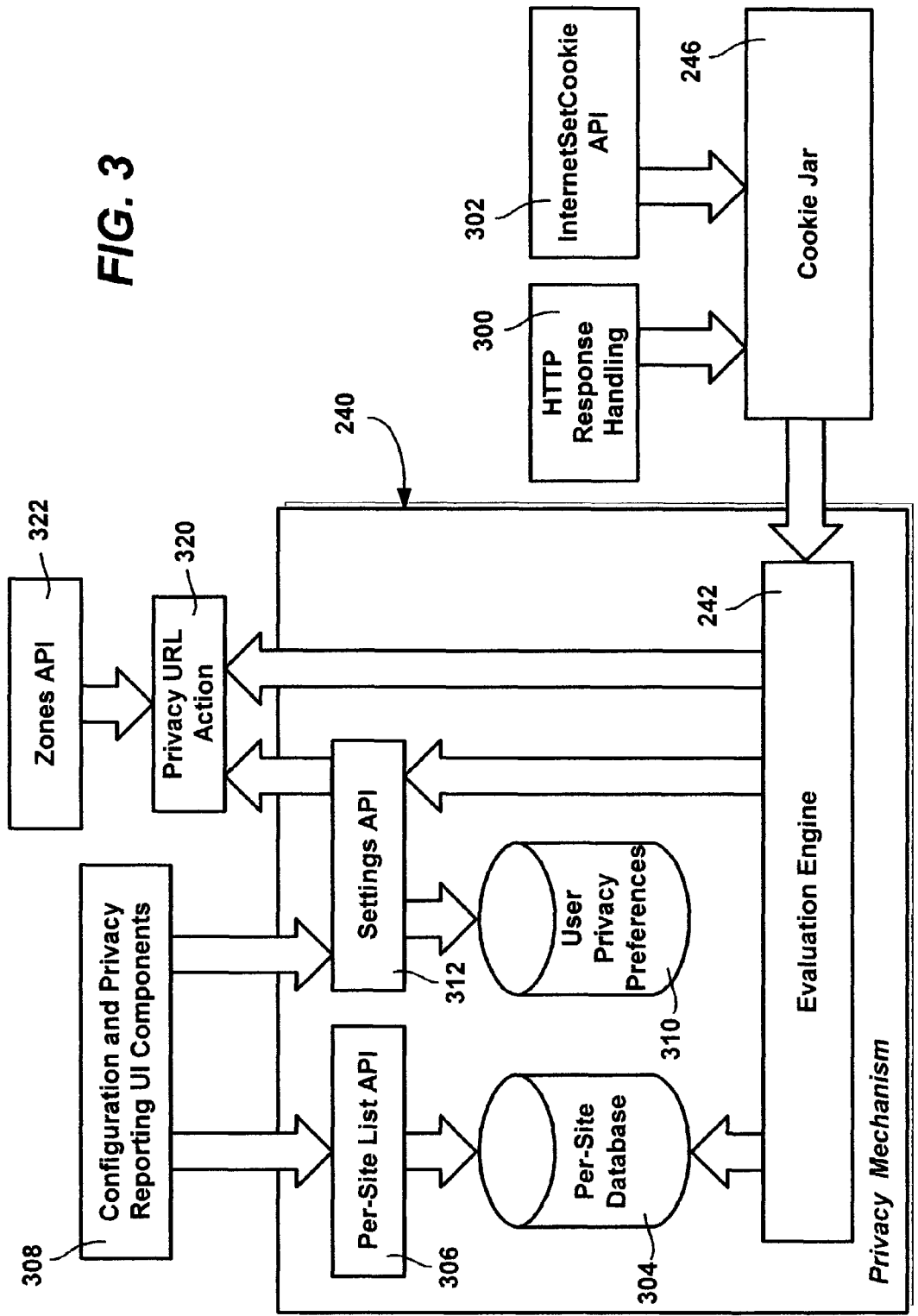
FIG. 3 is a block diagram generally representing a privacy mechanism including an evaluation engine that determines whether to allow or deny Internet cookie-related operations.

FIG. 3 represents one suitable implementation of the general components that can be logically thought of as comprising the privacy mechanism 240, including the evaluation engine 242, along with various other components connected thereto. In general, to request a cookie-related operation, the cookie jar 246 can be accessed in at least two ways, including via HTTP response handling code 300 (e.g., via a meta tag interpreted by the browser parser/interpreter code 222 that requests a cookie be set) and/or via script. With script, the script engine 226 calls an InternetSetCookie( ) API 302 that similarly requests that a cookie be set. The exchange of data for these operations are described below with respect to FIG. 4, however for now it suffices to understand that a server response (e.g., 206) may be requesting storage of a cookie.

Similarly, when a web site via a server response or other communication requests that a cookie be recalled from storage and provided to the site, referred to as a replay operation (or "replaying," "replayed" and so forth), the cookie jar 246 is accessed. Still further, cookie deletion requests are received at the cookie jar 246.

When accessed for a cookie-related operation, e.g., for cookie-related storing, replaying or deleting, the cookie jar 246 calls into the evaluation engine 242 for a determination as to whether the requested operation is to be allowed. In turn, the evaluation engine 242 evaluates various criteria to determine the privacy impact and thereby determine whether the requested operation may proceed. As described below, particularly with respect to the flow diagrams of FIGS. 5-7, the evaluation engine 242 executes code that takes the various sets of relevant information and determines therefrom whether the requested cookie operation is allowed. The criteria in the evaluation may include a web site's P3P compact policy, if any is provided, along with user privacy preferences, and characteristics of the operation itself.

More particularly, one aspect of the present invention is directed to a formalization of the concept of first party cookies versus third party cookies and a distinction between them with respect to privacy. A cookie is set on a domain or a host, and when a request directed to this domain or host is made at some point later in time, the cookie may be replayed. Initially, the browsing software 200 is directed to navigate to a URL (uniform resource locator, or URI, uniform resource identifier), which is the top level document, for example, http://www.anysite.com. For each URL downloaded as a dependency of the top level document, the host name is compared from right to left with the host name of the top level document to see if they match. If there is a mismatch in the name, the download is considered THIRD PARTY. If one of the names ends before a mismatch is found, the download is considered FIRST PARTY.

The following table sets forth examples:

| Top Level | Dependency | Result |
|---|---|---|
| www.anysite.com | www.anysite.com | First Party |
| www.anysite.com | anysite.com | First Party |
| www.anysite.com | othersite.com | Third Party |
| foo.anysite.com | bar.anysite.com | First Party |
| foo.anysite.com | anysite.com | First Party |
| foo.anysite.com | bar.foo.anysite.com | First Party |

When the browser parser/interpreter 222 processes the content, these dependencies are detected and passed along with a flag or the like that indicates their first or third party status to the evaluation engine 242, e.g., via a protocol stack. In keeping with one aspect of the present invention, first party and third party cookies may be distinguished from one another with respect to locally controlling (e.g., allowing, denying, downgrading, prompting for or leashing) cookie-related operations.

In addition to first or third party data, the evaluation engine 242 may distinguish between persistent and session cookies as described above. As a general rule, there is a higher threshold (lesser privacy settings) to store a persistent cookie than a session cookie. Indeed, one result is to downgrade a cookie from a persistent to a session cookie, meaning the cookie can be stored, but only temporarily (e.g., during the browsing session).

User Privacy Settings

In addition to the cookie's criteria, the evaluation engine may also refer to a per-site list that allows users to have a more-refined control over which sites are allowed to store cookies. As described below, for any specific site, users can specify an action for each site, either accept, i.e., always accept cookies from this site, deny, i.e., always reject cookies from this site, or use policy, i.e., perform normal evaluation of any P3P policy provided to determine whether to allow cookie-directed actions.

To make such site-based determinations, the evaluation engine 242 accesses a database 304 or the like comprising a per-site store relating sites to user settings. The database 304 may be accessed through a per-site list API 306 or the like, including by components 308 directed to user configuration and/or privacy reporting via user interface operations, while the evaluation engine 242 may be arranged to access the store 306 directly. For example, the user can specify sites through the browsing software's user interface 224, in particular via a per-site dialog 1400 described below with reference to FIG. 14, or via a utility program. The per-site database 304 maintains a list of specific web sites and the rules to be used when manipulating cookies for that web site, e.g., this store can specify sites for which cookies should always be accepted, never be accepted, or for which P3P evaluation should take place, as described below.

Another set of components of the privacy mechanism 240 is directed to storing the user's preference settings, in a preferences store 310, accessible via a settings API 312. The preferences store 310 provides data to the evaluation engine 242 indicating which P3P tokens are to be accepted or rejected, and under what circumstances.

Figure 12:
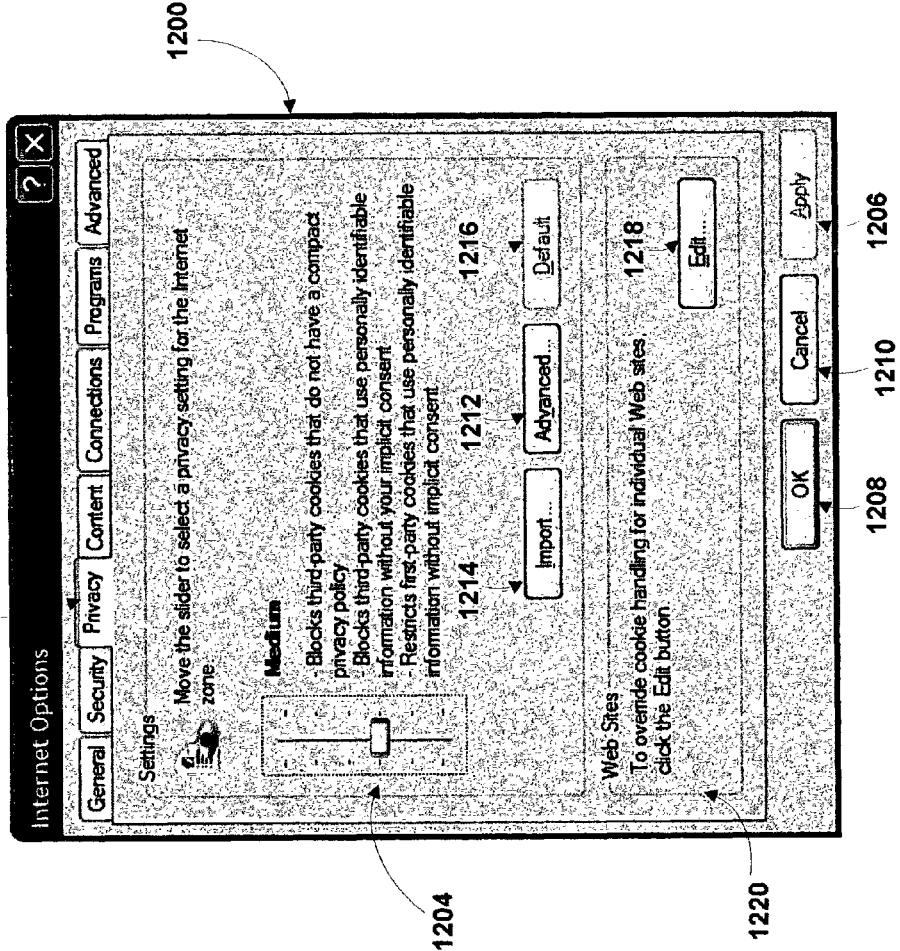
FIG. 12 is a representation of an example privacy settings user interface dialog provided to a user to enable the user to view and control privacy settings, in accordance with one aspect of the present invention.

The preferences store 310 contains the settings that relate to the P3P compact policy evaluation, and may be set from the configuration UI 308, e.g., the browser user interface 222, as exemplified with reference to FIG. 12. For example, the user may move a slider bar 1204 (FIG. 12) that sets one of six privacy levels, each of which have settings related to P3P tokens in the compact policy. At one level, for example, a "No Cookies" setting may be chosen, which if selected, does not accept or send any cookies (session and persistent), does not delete cookies, does not replay legacy cookies, and the per-site list does not override such rules. Various levels of privacy settings, including "Accept all cookies," "Low," "Medium," "Medium High," "High," and "No Cookies" are described below with reference to FIG. 12.

A privacy URL action component 320 is also provided, which comprises an instance of a URL action used to describe a behavior the browser software 200 should take with respect to privacy preferences. This URL action 320 comprises a global override that has three states, namely accept all cookies, reject all cookies, or proceed with P3P compact policy evaluation. One primary function of this feature is to determine whether to accept cookies coming in from a web site or set through script, or replay a cookie to a given host on a given HTTP request.

In general, sites may correspond to one of four zones, namely an Internet zone, a local intranet zone, a trusted sites zone, and a restricted sites zone. The Internet zone, by default, contains anything that is not on the user's computer, on an intranet, or assigned to any other zone. As can be appreciated, default settings and user adjustments thereto in general tend to be more conservative with respect to security and/or privacy when the user is accessing a site contained in the Internet zone, due to the number of unknowns that exist on with Internet sites in general. For example, and as described below, the user can set the browsing software 200 to generate a prompt (at least the first time) via the UI 224 before any cookie can be saved from an Internet zone site. The response to the prompt may be stored in association with this particular site so that the user need not again be interrupted when this site is accessed.

A Local intranet zone typically contains any addresses that do not require a proxy server, as defined by the system administrator. These may include sites identified by network paths (such as \\computername\foldername), and local intranet sites (typically addresses that do not contain periods, such as http://internal). A user or administrator can add sites to this zone, such as via a user interface. Since sites in such a zone are more trusted, the default settings tend to be such that the evaluation engine 242 allows cookie operations from web sites in this zone, although of course the actual settings determine the result.

The Trusted sites zone corresponds to sites that the user (or administrator) specifically believes can be sufficiently trusted such that files can be downloaded and/or run therefrom without worrying about damage to the user's computer or data. Such sites may be those having well-established, positive reputations, and the user can assign sites to this zone. Since such sites are trusted, security and privacy defaults to being relatively low, e.g., the default settings are such that the evaluation engine 242 will by default allow cookie-related operations from web sites in this zone to be performed on the user's computer and read by the web site that created them, at least for first-party cookies.

A restricted sites zone is essentially for sites that are the opposite of trusted sites. This zone contains sites the user does not trust, or is at least uncertain as to whether files can be safely downloaded and/or run from these sites. The user can assign sites to this zone. Default security and privacy levels for restricted sites zone is relatively high, e.g., by default the evaluation engine 242 may block the cookie operations from any web sites in this zone.

The global URL action evaluation and user preference setting evaluation performed by the evaluation engine 242 are zone dependent, i.e., per-zone. For example, global rules such as "reject all cookies from any sites in the restricted sites zone" but "use P3P evaluation for Internet zone sites" may be set. Further, the user preference settings depend on zone and cookie type (first or third party, persistent or session) combinations. Thus, for example, there may be sixteen combinations when using four zones, that is, four zones by two (first or third) party types by two (persistent or session) cookie-storage types. Note however that per-site information, (where the user identifies a specific site and controls the settings for it), is not zone dependent, except to the extent that a zone-dependent global URL action 320 may prevent the per-site information 304 from ever being evaluated, as described below with respect to FIG. 5.

Thus, the user can control and customize privacy by changing privacy levels on a per-zone basis, or, the user can customize the settings within a zone. The user can also customize settings for a zone by importing a privacy settings file, such as from a certificate authority.

In one implementation, rules are set and retrieved via functions, such as a PrivacySetZonePreferenceW Function and a PrivacyGetZonePreferenceW. The PrivacySetZonePreferenceW Sets the privacy settings for a given URLZONE and PrivacyType. The following tables describes this function:

```
DWORD PrivacySetZonePreferenceW(
    DWORD dwZone,
    DWORD dwType,
    DWORD dwTemplate,
    LPCWSTR pszPreference
);
```

The dwZone parameter specifies the URLZONE for which privacy settings are being set. The dwType parameter specifies the PrivacyType for which privacy settings are being set. The dwTemplate parameter specifies which of the PrivacyTemplates is to be used to set the privacy settings. If dwTemplate is set to PRIVACY_TEMPLATE_CUSTOM, the pszPreference parameter is the string representation of the custom preferences, otherwise, it is ignored. The function returns zero if successful, otherwise an errorcode is returned. For simplicity, the privacy options can be accomplished by moving a slider bar on a user interface to set the PrivacyTemplates for PrivacyTypes. Custom privacy preferences for a given URLZONE and PrivacyType can be set through the pszPreference parameter. The pszPreference parameter can contain a series of rules separated by white space describing the privacy preferences. Note that the rules themselves cannot contain white space. The pszPreference has the following structure, where there can be multiple logical rules:

<signature> <logical-rule> <special-rule> wherein, for example, the signature may be set to "IE6-P3PSettings/V1:".

Logical rules have the following format:

/<expression>=<decision>

An expression is a Boolean statement composed of compact policy tokens using the operators "&" (logical AND) and "!" (logical NOT). In one implementation, the compact policy token is case-sensitive. The decision is a single lowercase character that defines the action to take on the cookie whose compact policy contains the specified token or tokens. The following table lists valid decision characters:

| Character | Definition |
|---|---|
| a | Accept cookie |
| p | Prompt user to accept or deny the cookie |
| r | Reject the cookie |
| l | Leash the cookie (only send it in a first-party context) |
| d | Downgrade the cookie, if it is a persistent cookie, to a session cookie. |

Logical rules are evaluated in the order they are listed. The first logical-rule to be matched, if any, determines the cookie action. An empty expression is also allowed. If an expression is empty, the left-hand side evaluates to true. This form of a logical-rule can be used at the end of a set of rules to catch all situations that did not fall into the other categories. The following examples show valid logical rules:

/DEM=d/
    Deny a cookie whose compact policy contains the DEM token
/CON&!TEL=a/
    Accept a cookie whose compact policy contains the CON token and does not contain the TEL token
/=a/
    Accept all cookies Special rules may be specified using the nopolicy, session, and always symbols. The nopolicy symbol is used to specify the action to taken when there is no compact policy. For example nopolicy=d specifies to downgrade all cookies without a compact policy to session cookies. The session symbol is used to specify the action to take on session cookies, and can only be set to session=a. When session=a is specified, session cookies are accepted regardless of the content of the compact policy. If this rule is not specified, session cookies are subject to the same rules as persistent cookies. Also, the always symbol is used to specify to perform the same action for everything. For example, always=d specifies to deny all cookies regardless of the existence of a compact policy. Note that always=d is equivalent to /=d/.

The following example shows a privacy preferences string that specifies to accept cookies for which the compact policy contains a FIN/CONi token pair, reject cookies with compact policies containing FIN/CON, FIN/CONo, FIN/CONa and GOV/PUB token pairs or a TEL token, and to prompt the user when a cookie's compact policy contains the UNR token. It also specifies downgrading cookies without a compact policy to session cookies, and to accept all cookies that do not match one of the given rules. Note that the first rule that evaluates to true determines the cookie action:

---
IE6-P3PSettings/V1: /FIN&CONi=a/ /FIN&CONo=r/ /FIN&CONa=r/ /FIN&CON=r/ /GOV&PUB=r/ /TEL=r/ /UNR=p/ nopolicy=d /=a/

---

Rules are retrieved using the PrivacyGetZonePreferenceW Function. This function retrieves the privacy settings for a given URLZONE and PrivacyType, and has the following format:

---
```
DWORD PrivacyGetZonePreferenceW(
    DWORD dwZone,
    DWORD dwType,
    LPDWORD pdwTemplate,
    LPWSTR pszBuffer,
    LPDWORD pdwBufferLength
);
```
---

The dwZone parameter specifies the URLZONE for which privacy settings are being retrieved. The dwType parameter specifies the PrivacyType for which privacy settings are being retrieved. The pdwTemplate parameter returns a pointer to a DWORD containing which of the PrivacyTemplates is in use for this dwZone and dwType. The pszBuffer parameter that points to a buffer representing a string version of the pdwTemplate or a customized string if the pdwTemplate is set to PRIVACY_TEMPLATE_CUSTOM, as described above. The pdwBufferLength contains the buffer length in characters. If the buffer length is not sufficient, PrivacyGetZonePreferenceW returns with this parameter set to the number of characters required and with a return value of ERROR_MORE_DATA. The function returns zero if successful or an errorcode.

Figure 4:
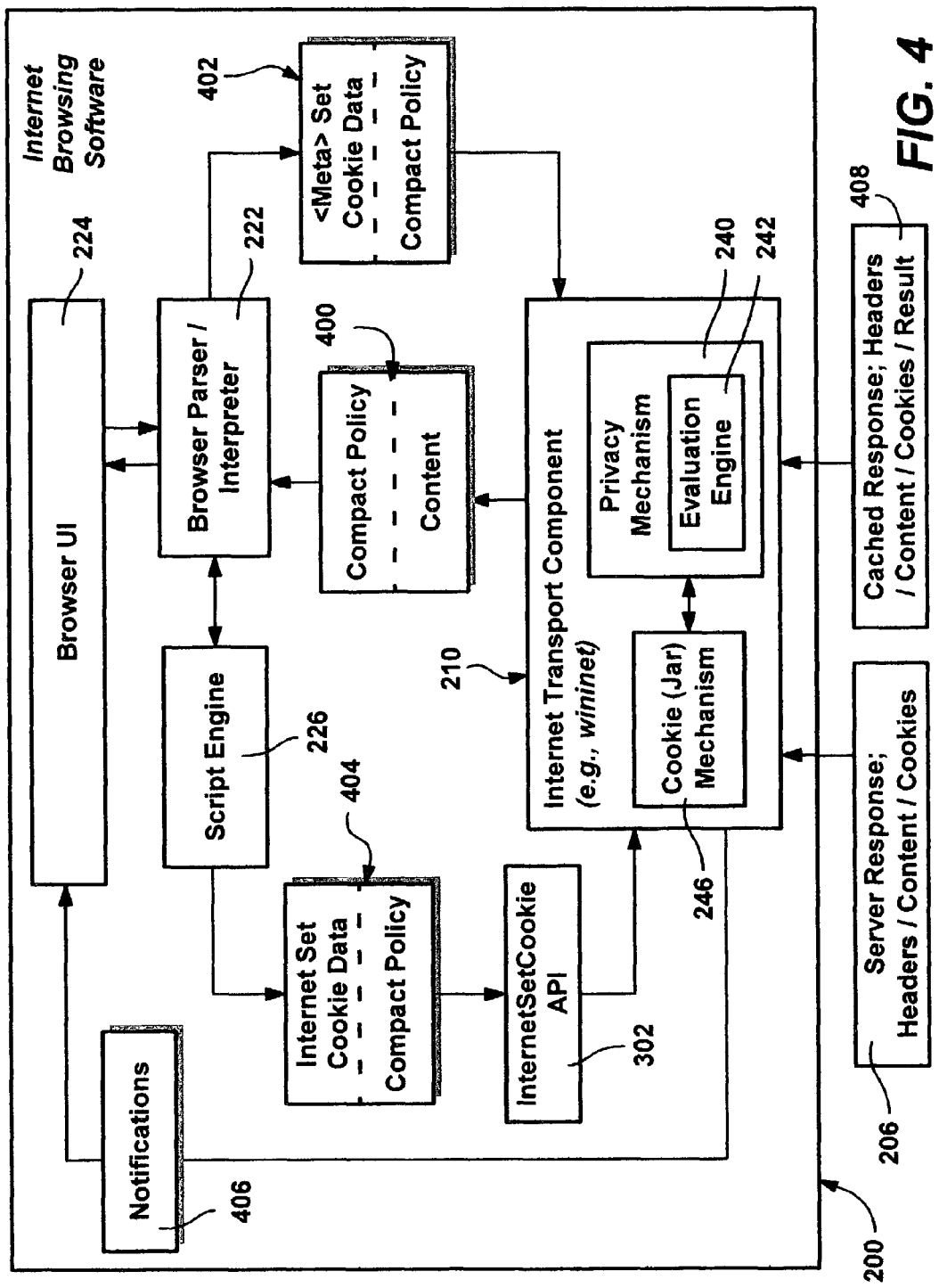
FIG. 4 is a block diagram generally representing data exchanged among components to provide internet privacy evaluation.

Turning to FIG. 4, as described above, cookies can be accessed by HTML interpretation (e.g., via a cookie-related meta set cookie tag). To this end, the internet transport component 210 provides the compact policy and content 400 to the browser interpreter/parser component 222. When such a meta tag is detected, the browser interpreter/parser component 222 sends the set cookie command and the compact policy data, represented as the block 402, back to the internet transport component 210. Other information such as the first or third party context also may be provided. In turn, the cookie jar 246 invokes the evaluation engine 242 (as generally described above in FIG. 3 via HTTP response handling 300) with respect to the privacy mechanism 240. The evaluation engine 242 then specifies an action (e.g., allows, denies, prompts for, leashes or downgrades) the requested cookie-related operation based on the various criteria, e.g., user settings, zone, P3P compact policy, per-site data, type of cookie and so on as described herein. Other cookie-related operations (e.g., replay) occur similarly.

Cookie operations from script are handled in a similar manner. For example, when cookies are set from script, the same general series of steps is taken in evaluating the cookie operation. The InternetSetCookie API 302 is called directly to set the cookie from the script engine 226. In turn, the InternetSetCookie API 302 calls into the cookie jar 246, which calls into the evaluation engine 242 as appropriate. The extra information 404 needed to make the evaluation is passed with the call, including the P3P compact policy to evaluate for this operation. Also, the first versus third party context of the operation is provided, e.g., as determined previously by the browser interpreter/parser component 222.

As also represented in FIG. 4, one aspect of the present invention is directed to providing notifications 400 of privacy-related information to applications using the internet transport component 210 platform. In general, any handling of cookies by the internet transport component 210 leads to appropriate notifications provided by the platform to the browser UI 224, (or similarly to applications or other components using the internet transport component 210). These notifications 400 are sent at several different times throughout the processing of the policy, as set forth in the following table:

| NOTIFICATION | EXPLANATION |
| --- | --- |
| INTERNET_STATUS_COOKIE_SENT | Sent when a cookie is successfully sent on an HTTP request |
| INTERNET_STATUS_COOKIE_RECEIVED | Sent when a cookie is accepted (based on evaluation processing) |
| INTERNET_STATUS_PRIVACY_IMPACTED | Sent when a cookie is somehow modified based on privacy evaluation - downgraded, leashed, or rejected, as described below. |
| INTERNET_STATUS_P3P_HEADER | Sent when a P3P header is found in the HTTP response |
| INTERNET_STATUS_P3P_POLICYREF | Sent when a P3P policy ref is found in the HTTP response |

The received notifications 400 are used by the browser software 200 to populate the various UI elements and to present privacy impact information to the user, as described below. Any P3P header provided by these notifications may be stored, for later use as appropriate, e.g., during script cookie operations. This policy is received and stored from the notifications 400 described above, and reused as necessary when manipulating script cookies.

As further represented in FIG. 4 as a cached response 408, content may be received from the cache 230 (FIG. 2). In general, extra information (e.g., the prior evaluation result) may be stored in the cache to keep track of privacy related actions taken at HTTP response time. Notifications are generated when content is replayed from the cache, mimicking behavior seen when a real response is seen.

More particularly, extra processing may be performed when such content 408 is stored in and received from the cache 430, using the information about the state of the cookie handling that is stored along with the cached content. Should such information be present when content is retrieved from the cache instead of the network, an INTERNET_STATUS_COOKIE_HISTORY notification is sent, informing the host of the previous actions taken, including cookies that were accepted, leashed, downgraded, or rejected. This cached information can be used as needed, e.g., to reject a set cookie request that was previously rejected so that the cookie operation determination is consistent with what occurred at the time the response was initially received, handled and cached.

Also, at cache processing time, the P3P compact policy (which is cached with the content) is reevaluated to regenerate the policy related notifications. In this manner, the host gets a comparable set of notifications whether the content is retrieved over the network connection or from the cache.

Note that because the compact policy is available from the cache, it is alternatively feasible to perform an entirely new evaluation when cached content is recalled, which may have a different result since user settings or the like may have changed in the interim.

Figure 5:
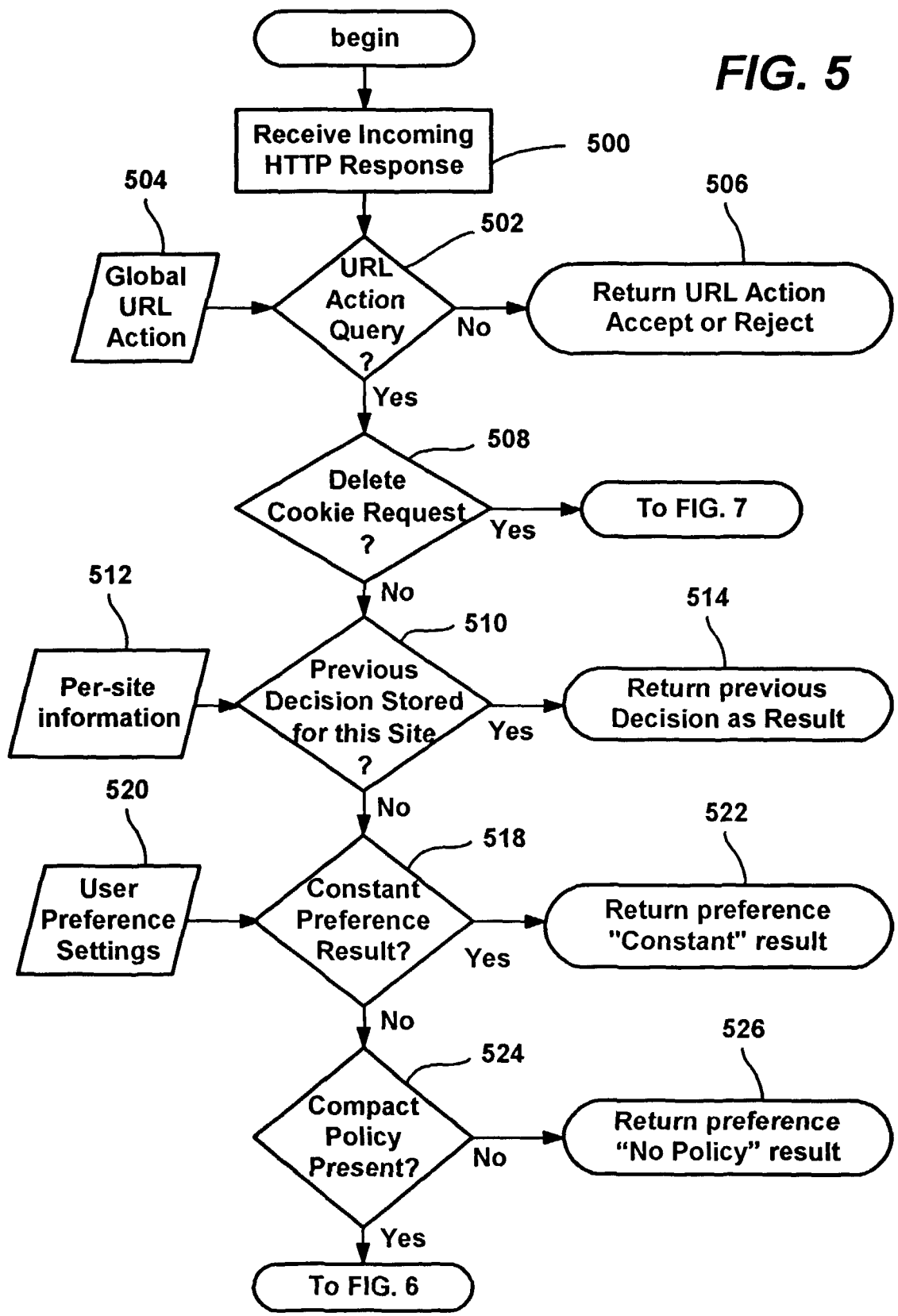
FIGS. 5-7 comprise a flow diagram representing exemplary logic and related operations performed by the evaluation engine to evaluate and determine whether a requested cookie-related operation is allowed or denied.
Figure 6:
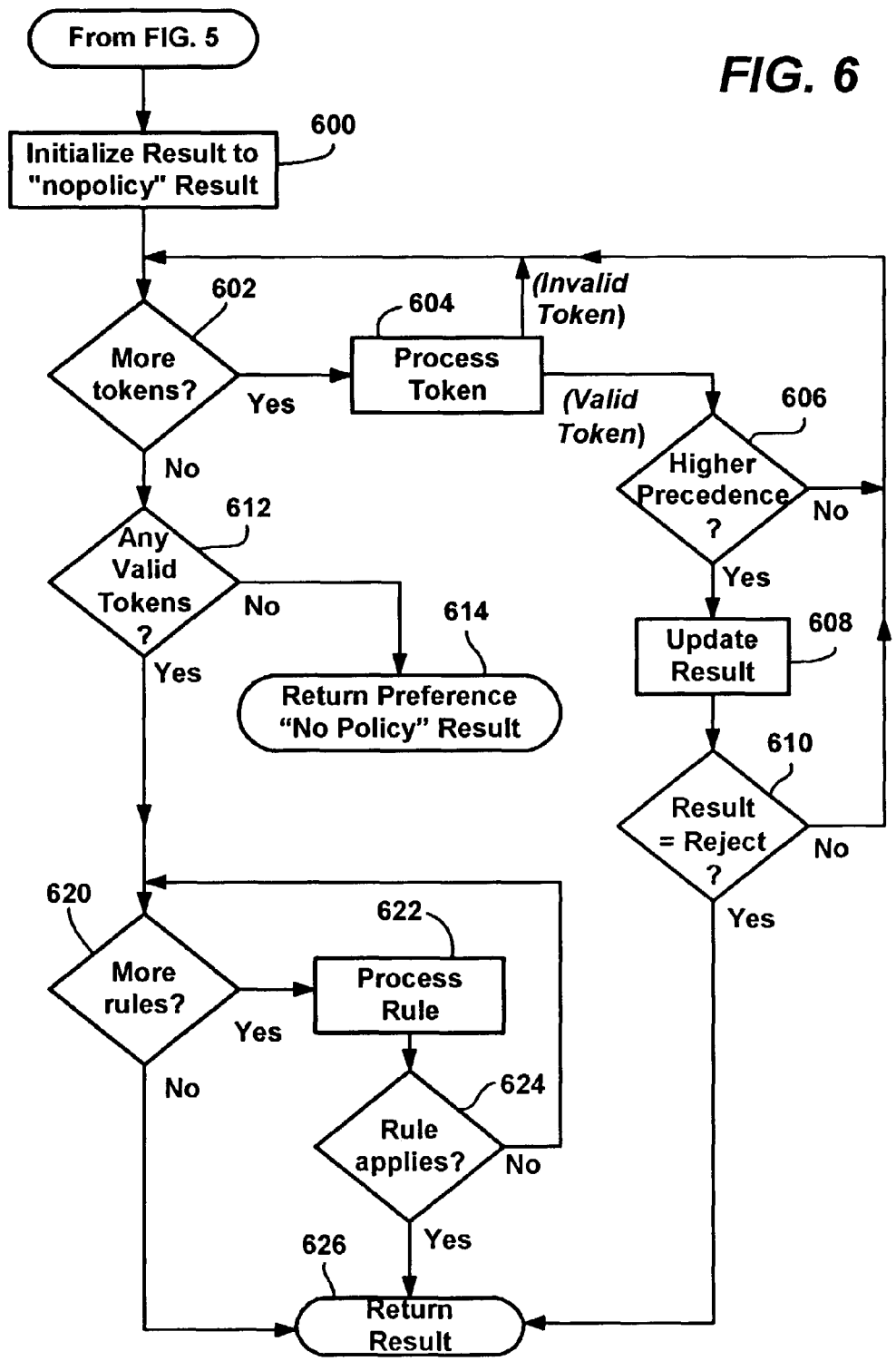
Figure 7:
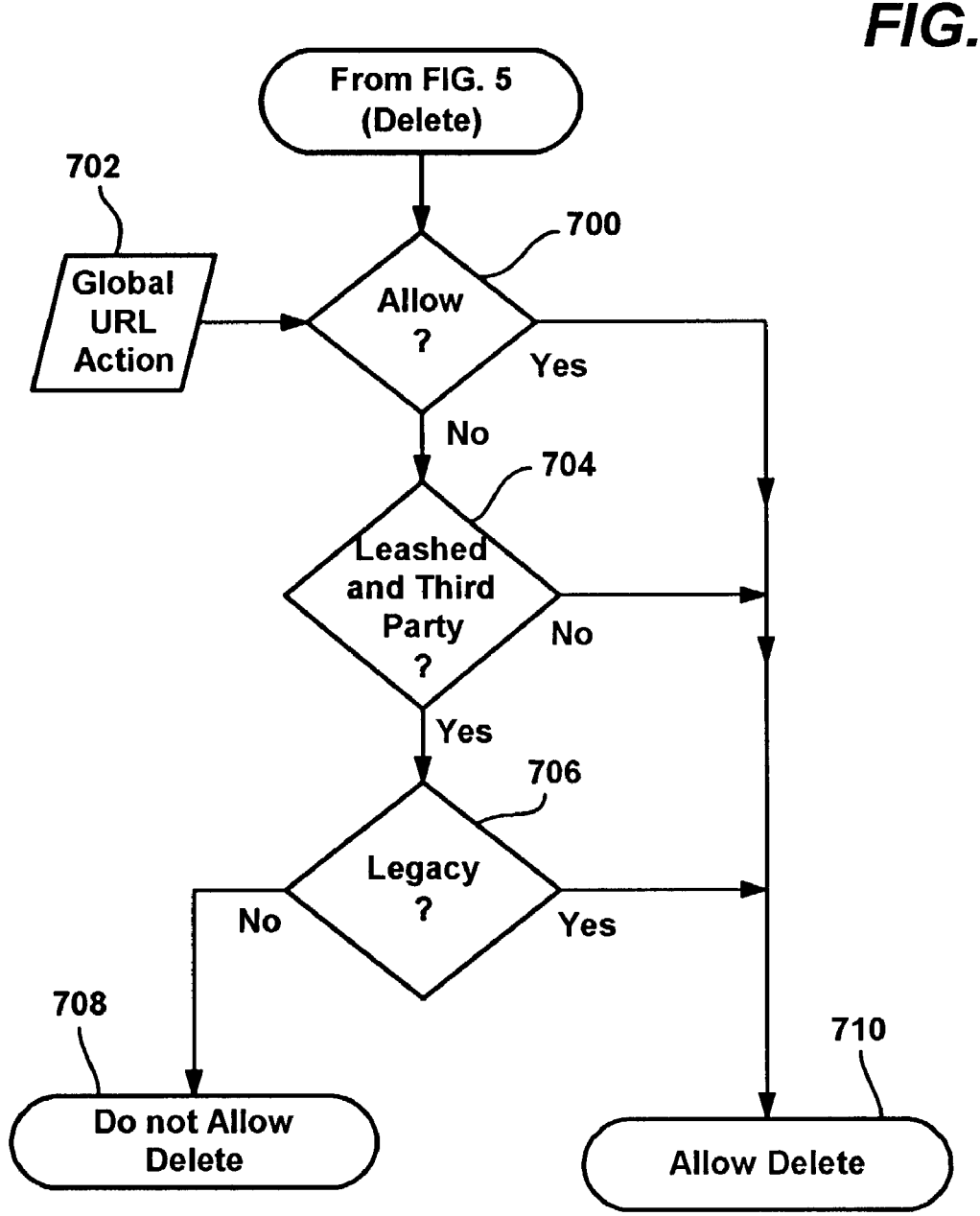

Turning to an explanation of the operation of the privacy mechanism with particular reference to FIGS. 5-7, the evaluation engine generally executes logic to make its determination based on the above-described criteria. Note that the steps of FIGS. 5-7 are only representative of one way to make such a determination, and that there are many ways to accomplish an evaluation and determination. Further, note that many of the steps shown as being performed in and/or by the evaluation engine can be performed by other components, e.g., a security component can enforce a globally applicable cookie rule before the cookie jar 246 is ever involved and thus can block cookies without needing to invoke the evaluation engine. In any event, it is understood that the evaluation engine and the various operations described in FIGS. 5-7 are but one way to accomplish privacy via local control of cookie operations.

Before describing the various operations of the evaluation engine, however, it should be noted that cookies may be stored on a machine prior to the privacy mechanism/evaluation engine having been installed and activated on that machine. In other words, when such "legacy" cookies exist prior to installation of the privacy mechanism/evaluation engine, web sites may already have some profile information. Such cookies may be suppressed in a third party context, in order to prevent such web sites from continuing to gather information. In order to accomplish this, the privacy mechanism automatically disallows third party replays while allowing first party replays, i.e., the privacy mechanism "leashes" legacy cookies when installed. An exception to this general rule is that "opt-out" cookies are left unleashed, since it is assumed that users that have previously opted out of web site services wish to remain opted out. Such opt-out cookies are of the form "ID=OPT_OUT", although several other opt-out cookies already in use in the industry were also specifically excluded, e.g., "AA002=optout" and "CyberGlobalAnonymous=optout".

Beginning at step 500 of FIG. 5, the process generally begins when an incoming HTTP response is received. Note that in one preferred implementation, this HTTP response is not a cached response, since in this implementation, with cached responses, any prior cookie evaluation results are also preserved and reused. However, in an alternate implementation described above, since the compact policy data is cached, the operations of FIGS. 5-7 may also be executed on cached data.

Step 502 represents the testing for the URL query action, that is, the top-level override, which includes looking up the settings for this zone as represented by the input. More particularly, a check URL action comprising a flag that can be queried programmatically can be set to an accept all cookies state, or a reject all cookies state, which map directly to the (e.g., zone-dependent) accept all/reject all privacy levels described above. If set to one of these states, step 502 branches to step 506 to return the accept or reject result.

A third state of this flag (called "QUERY") allows processing to continue to step 508. Step 508 determines whether the request is to delete a cookie, which is handled as described below with respect to FIG. 7. If not a request to delete, step 508 branches to step 510.

Step 510 represents evaluating any per-site information, accessed via step 512, e.g., by accessing the per-site database (store or list) 304. At step 510, the per-site store is checked to see if there is an action for this URL. This action could have been set a number of ways, e.g., through the browser UI 224 as described below. An action may also have been set if the browser previously prompted the user for a decision for this URL, and saved the result of the prompt, as also described below. If a previous decision exists, step 510 branches to step 514 to return the previous decision for this cookie. If no previous result exists for this URL, the evaluation process continues to step 518.

Step 518, via step 520, reads the user preferences from the user preferences database 310. At this time, the user preferences are queried based on the zone, the first versus third party designation, (made at the beginning of the download) and the persistent or session type to which the cookie corresponds. As described above, one type of preference is a constant preference of the form "always=<result>"; if so, the result is returned at this time via step 518 branching to step 522. For example, a restricted zone site's third party, persistent cookie may be set to "always=reject" while a trusted zone site's first party, session cookie may be set to "always=accept." In such an event, the result is simply returned at step 522. Alternatively, if there is no constant preference stored for the particular set of criteria that pertains to this cookie, step 518 branches to step 524.

Step 524 evaluates whether the site has provided any P3P compact policy in the P3P header 214. Note that sites are not required to provide policy, (however as will be understood, such sites are less likely to get their requested cookie operations allowed). Should no policy be present, a "nopolicy" result (that at least exists by default, and is obtained when the user preferences were previously read at step 520) is returned at step 526. Otherwise, if a policy is present the evaluation process continues to FIG. 6, step 600.

At step 600, a result variable that tracks the determination result that may ultimately be returned is initialized to the "nopolicy" decision read from the user preferences at step 520. As described below, should no valid tokens and/or corresponding rules be found in the evaluation of the compact policy, this "nopolicy" decision will be the result returned.

Step 602 represents the starting of the evaluation of the tokens in the compact policy, until none remain to be processed at step 604, which is branched to if at least one token is present. Note that step 604 skips over invalid (e.g., unrecognized) tokens, and thus if no valid tokens are found in the compact policy, the final result is returned which is the "nopolicy" result initialized above, as represented via steps 612 and 614.

Returning to step 604, for each valid token listed in the compact policy, the user preference rules (read at step 520) are consulted to find a result. For example, the tokens T1 and T4 may have a result of "accept" maintained in the user preference rules for this zone, cookie type criteria, while token T14 of FIG. 2 may have a result of downgrade corresponding thereto in the user settings for the current criteria.

The various possible results have a precedence ordering, and the evaluation engine essentially keeps the result that gives the most privacy, with the precedence order comprising reject (highest), downgrade, leash, prompt, or accept (lowest). As can be understood by noting that a higher precedence result at step 606 results in an update to the tracking variable at step 608, this obtaining of the higher precedence (most privacy) result among the tokens is represented via the loop of steps 606, 608 and 610, back to step 602. Thus, in the example of FIG. 2 with tokens T1, T4 and T14 being present in the compact policy, and tokens T1 and T4 being accept, with T14 being downgrade in the user preference settings for this zone and cookie criteria, the updated result ultimately set at step 608 will be to downgrade, via the token T14's corresponding setting. Note that while looping, if any token has a corresponding rule with a result equal to reject, the highest precedence is already known, and there is no point in continuing, whereby step 610 simply ends the evaluation process with the reject result returned via step 626.

Once the tokens in the compact policy have been processed as determined by step 602, step 612 tests whether at least one valid token existed (such as by setting a flag at step 604). If not, step 612 branches to step 614 to return the initialized, "no policy" result, else step 612 branches to step 620 to consult user preference rules.

Step 620 looks for rules, e.g., in the form of rules or logical expressions as described above. As represented via steps 620, 622 and 624, for each rule found in the user preferences (read at step 520), the rule is evaluated against the compact policy. Should the rule be applicable (that is, each binary clause in the rule is true for this policy), the result of the rule is returned as the final result. Note that the first rule to apply ends the loop, with its result returned at step 626, although it is feasible to have a precedence-based arrangement (similar to that above) such that the rule with the highest precedence would win. Further, note that should no rules apply at step 624, the result that existed when step 620 was first entered (via step 612) is returned.

Turning to FIG. 7, deletion of a cookie occurs when a website sets a cookie with an expiration time in the past. Step 7 represents the following rules that apply when deciding whether or not a cookie can be deleted, namely that leashed cookies cannot be deleted from a third party context unless the URL action allows it, with one exception being legacy cookies that were marked as leashed on upgrade. To this end, step 700 via step 702 tests for the global URL action of allow, in which event the delete is allowed at step 710. Step 704 tests for the prevention of deleting of a leashed and third party cookie, (i.e., deletion is otherwise allowed). Step 706 tests for the legacy cookie exception for leashed and third party cookies, thereby preventing deletion, except for legacy cookies.

Internet Privacy User Interface

One aspect of the present invention is generally directed to providing privacy to Internet users by handling cookies based on users' privacy settings, which may be default settings provided with the browser code. By the present invention, users are made aware of Internet privacy issues, and also made aware of the fact that cookies can be used to gather data. Further, users are made aware of which sites are part of a page of content being viewed, and/or which sites are attempting cookie-related operations. Note that while privacy via automatic cookie handling is generally provided for sites in the Internet security zone only, there is no reason that privacy via cookie handling cannot be performed in other security zones in a similar manner. Indeed, the present invention provides the ability to handle cookies differently on a per-site basis, and there is no reason to restrict such sites to those in the Internet security zone.

The present invention also provides default settings for handling cookies at various privacy levels to reasonably protect users' privacy, in accordance with each user's own desired level of privacy. A slider bar is available to change levels of default settings (e.g., block all, high, medium high, medium, low or accept all), or the user can change the default settings and/or individually control the settings for a given web site. To this end, access is provided to at least some of the individual privacy settings, whereby more advanced users or administrators can customize the privacy settings to more particularly control what web sites can and cannot do with cookies on a user's machine.

Figure 8:
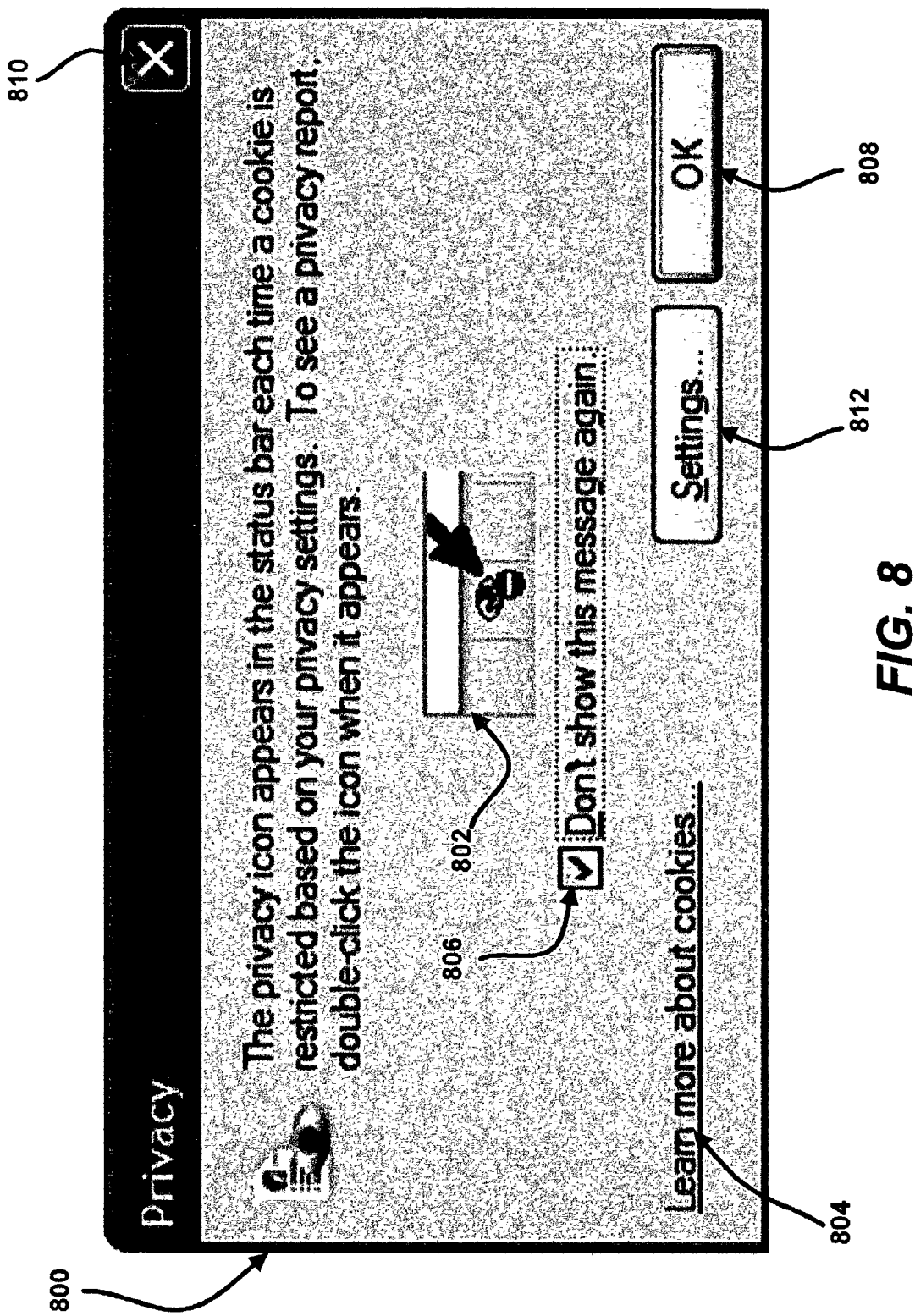
FIG. 8 is a representation of an example initial privacy user interface provided to a user a first time a cookie operation is blocked, in accordance with one aspect of the present invention.

In accordance with one aspect of the present invention, FIG. 8 represents a suitable display (e.g., dialog box) 800 that appears the first time a user has a cookie blocked for privacy reasons. Note that similar displays would also be suitable at other times, e.g., the first time that browser code is executed, regardless of whether cookies are blocked. However, providing the display upon blocking a cookie has the advantage of providing a meaningful context to a user based on a current state of browser operation as opposed to a future or past state.

Thus, in one implementation as represented in FIG. 8, the first time that a user navigates to a web site where at least one cookie action is blocked, the user receives an initial privacy warning dialog 800 that actively explains the cookie-blocking event, and shows a diagram 802 and various text explaining where a privacy status icon 900 (FIG. 9) is shown in the status bar 902 of a browser window 904. This initial privacy warning dialog box (also referred to as a first time privacy user interface) 800 enables a user to learn more about cookies, via a link 804 to a help screen, which may be internal browser/operating system help, or external such as another web site or the like. The user may toggle a checkbox 806 so that the message will or will not be shown again upon selecting the OK button 808 or close [X] button 810. To this end, in one implementation, when a cookie is blocked, the internet transport component 210 (FIG. 2, e.g., wininet.dll) fires a "PrivacyStateImpacted" event, and the registry or the like is checked to see whether this first time privacy user interface 800 has yet been shown and previously dismissed by the user. If not, the dialog 800 is shown.

The initial privacy dialog box 800 also includes a settings button 812 that takes a user to a privacy settings user interface dialog 1200, described below with reference to FIG. 12. To this end, if the user clicks the "Settings" button 812, the browser launches the privacy settings user interface 1200. Note that as described below, the privacy settings user interface 1200 can be launched in other ways.

In general, the initial privacy dialog box 800 is an active mechanism related to privacy, and thus has a number of beneficial purposes, including 1) notifying the user of a cookie being blocked, 2) explaining the general concepts of privacy, and 3) explaining the use of a privacy status icon 900 (FIG. 9) to access privacy reports and perform other privacy-related actions. Further, via the settings button 812, the initial privacy dialog box 800 provides one entry point to the privacy settings user interface 1200.

Once the active mechanism of the initial privacy dialog box 800 is dismissed by the user, the user can control privacy via a passive mechanism, namely a privacy status icon. In this manner, users are not annoyed (unless they choose to be) by privacy issues through a regularly appearing active dialog, but can easily and rapidly handle privacy issues via the passive mechanism.

Figure 9:
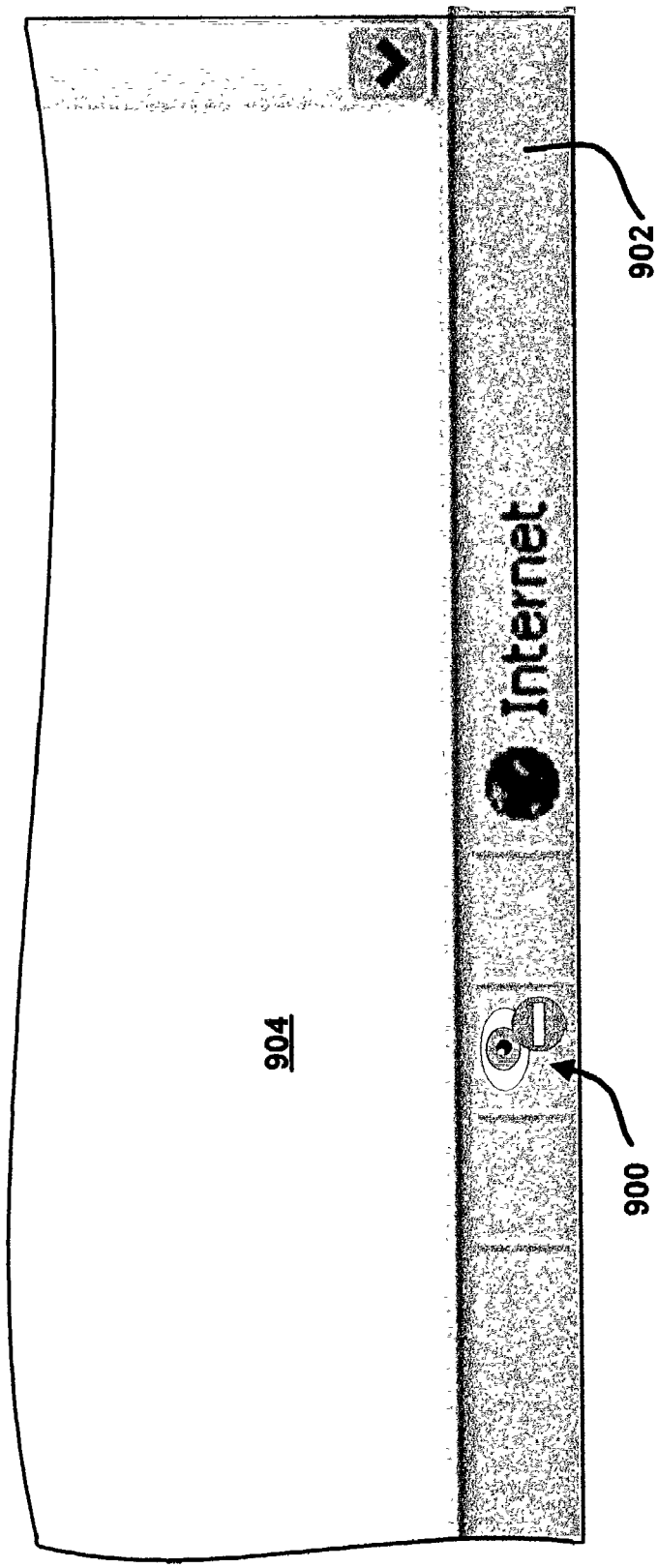
FIG. 9 is a representation of an example privacy status icon provided to a user whenever a cookie operation is blocked, in accordance with one aspect of the present invention.

FIG. 9 shows a portion (e.g., the lower right corner) of a browser window 904 including the above-mentioned status bar 902 and actual status icon 900 indicating a blocked cookie. In one implementation, the icon generally appears as an "eyeball" accompanied by a "Do Not Enter"-like sign, (which may be red or otherwise appropriately colored to make the icon more noticeable), such as to generally convey the concept of blocking surveillance. In general, whenever a user navigates to a web site that does not provide privacy information that satisfies the user's privacy settings, the cookies are blocked and the privacy status icon 900 is displayed in the browser's status bar 902 to indicate that cookies have been blocked. For example, the browser code can show the privacy status icon 900 upon detecting the PrivacyStateImpacted event fired by the internet transport component 210. As described below, providing the status icon 900 provides a visual indication of the blocking action, as well as a straightforward actuation mechanism (e.g., the user double-clicking the icon) for the user to access the list of sites having missing or unsatisfactory privacy policies.

For example, when the status icon 900 is actuated, a privacy report dialog 1000 (FIG. 10) is launched with a parameter that initially limits the dialog to showing a list 1002 of only the restricted sites that caused firing of the event. Once the sites are displayed, the user is able to select each one of the sites to view its published privacy policy information, if any, and thus decide whether and how to conduct business with that site. Thus, the status icon 900 notifies users when cookies are blocked, and provides an entry point to the privacy report dialog 1000, from where a user can view and control privacy data.

Figure 10:
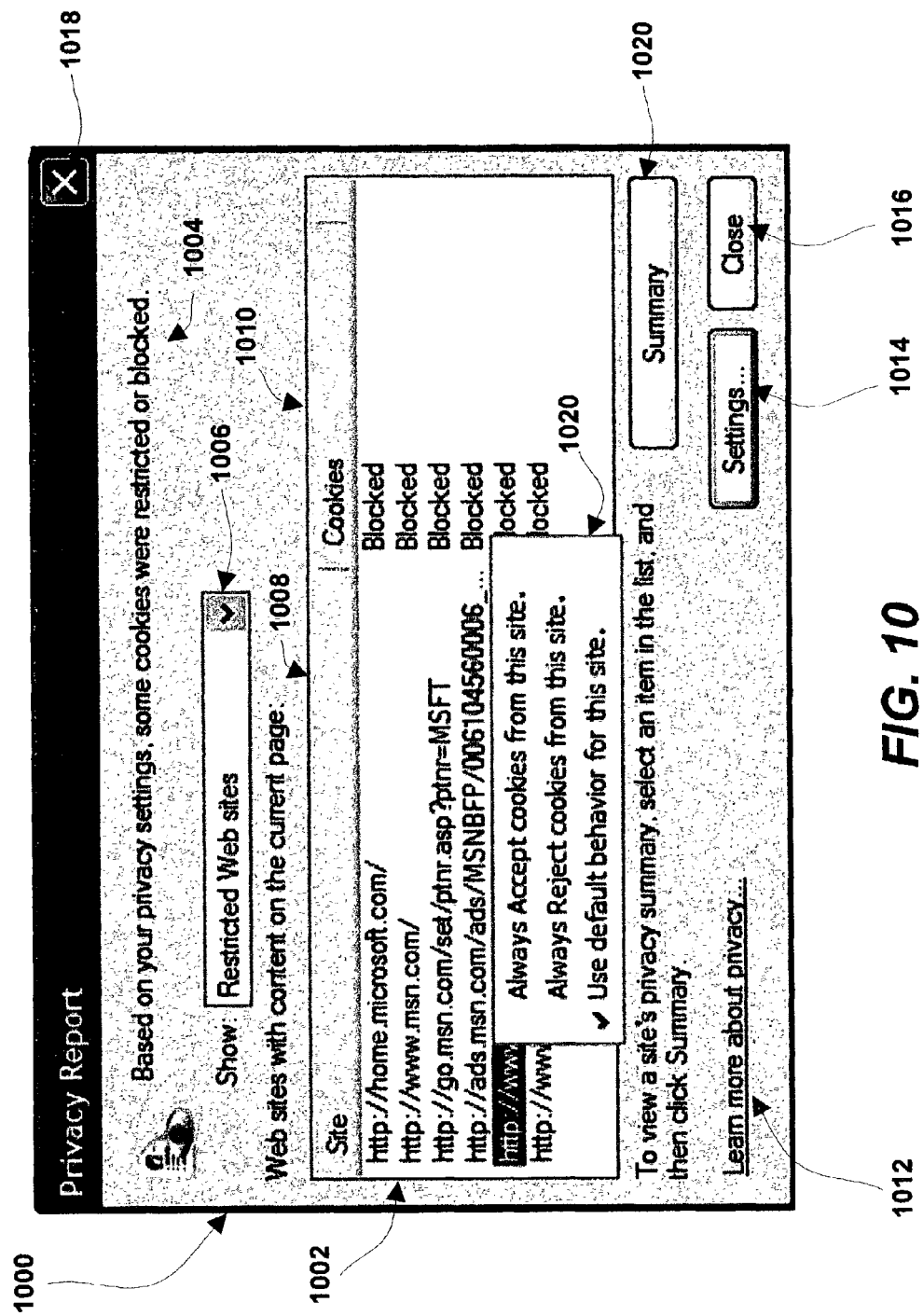
FIG. 10 is a representation of an example privacy report user interface dialog provided to a user when the user actuates the privacy status icon of FIG. 9, in accordance with one aspect of the present invention.

FIG. 10 shows a representative privacy report dialog 1000, including some textual reference data 1004 explaining its general purpose. In general, the purposes of the privacy report dialog 1000 include displaying the list 1002 of sites that had privacy protections enforced against that site, or optionally displaying a list of all sites that include content on the present page. As all the sites that form a page of content are known to the browser, a filtering operation can be employed to select only those sites that had privacy protections enforced against them.

To toggle between views, the privacy report dialog 1000 includes a view selection mechanism 1006, via which the user can toggle between a displayed list 1004 of those sites that make up the currently rendered page that were restricted by having their cookies blocked, or a list of all sites (not separately shown) that make up the currently rendered page. A site column 1008 and cookie column 1010 show the site and its corresponding cookie status, respectively. Note that when viewing all sites, each site may have a "Blocked" cookie indicator, or an "Accepted" cookie indicator, or no cookie-related action and thus no information in the corresponding cookie column. Other information may also be displayed, e.g., distinguishing between session or persistent for an accepted cookie. Indeed, as can be readily appreciated, the ability to view and control actions for individual sites forming a rendered page can be extended to control more than cookie-related/privacy actions. For example, instead of limiting a user to per-domain security, a user could choose to adjust security of selected sites that make up a page, and thereby control things at a more granular level, such as to prevent a third party site from running script, and so on.

In keeping with the invention, a link 1012 to a help screen or the like, e.g., "Learn more about privacy . . . " is provided to inform the user about privacy issues. A "Settings" button 1014 is provided to take a user to the privacy settings user interface dialog 1200, described below with reference to FIG. 12. Close buttons 1016 and 1018 are also provided.

To facilitate rapid per-site privacy settings adjustment, a pop-up window 1020 can be made to appear by right-clicking on a selected site, via which the user can select privacy selections for that site by checking (with a subsequent left click) one of the various cookie-handling options for that site. Three mutually exclusive selection options are represented in FIG. 10, Always Accept cookies from this site, Always Reject cookies from this site, or Use default behavior for this site. Handling a site by using "default behavior" is described above with reference to handling a cookie by its type.

Another primary purpose of the privacy report dialog 1000 includes providing an entry point to a privacy summary for each listed site. To this end, when a listed site is selected (e.g., by a left click), a "Summary" button 1020 is enabled. Clicking the Summary button 1020 opens a separate privacy policy dialog box 1100 (FIG. 11).

Figure 11:
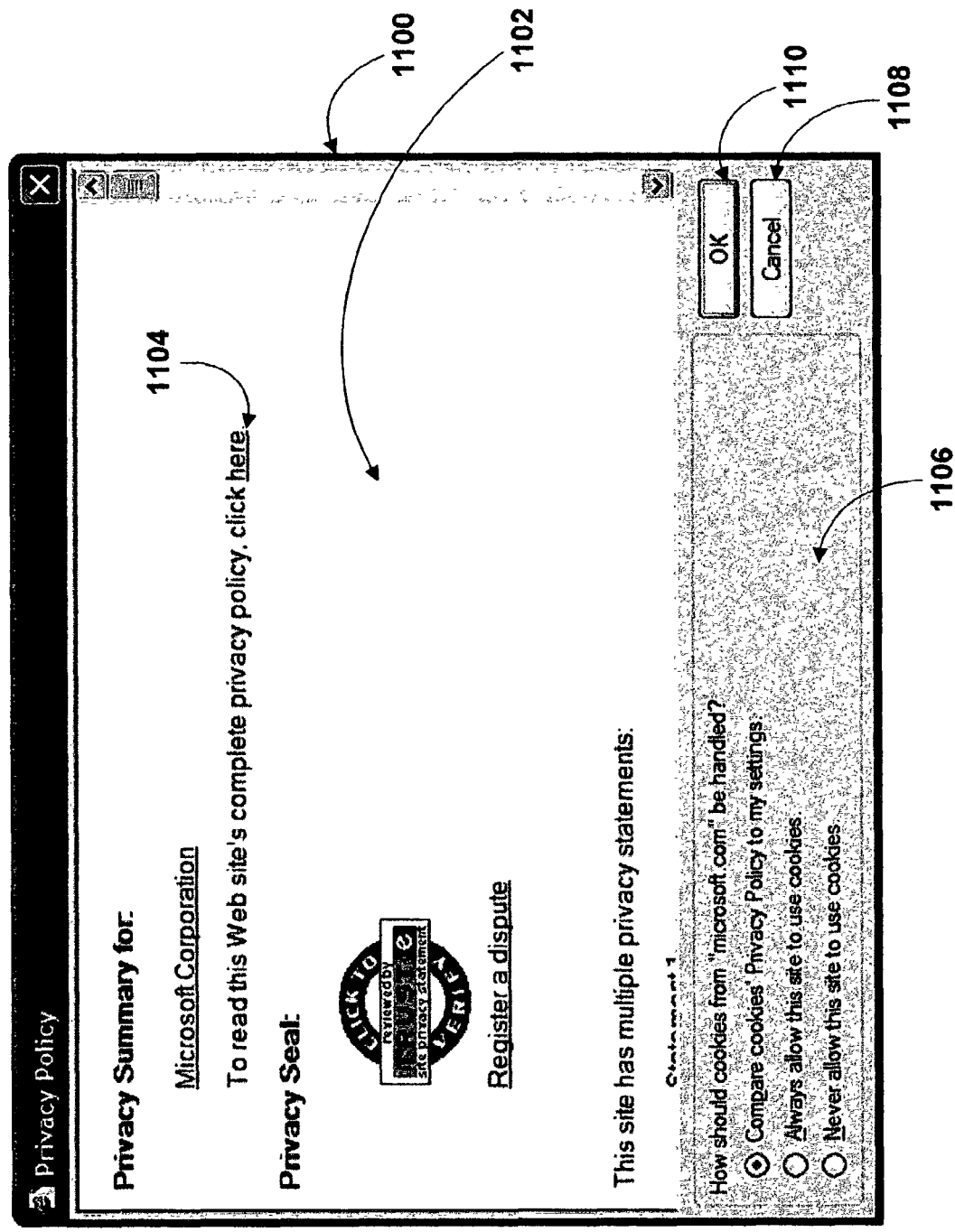
FIG. 11 is a representation of an example privacy policy summary dialog provided to a user when the user selects a site listed on the displayed privacy report user interface of FIG. 10, in accordance with one aspect of the present invention.

FIG. 11 shows a representation of one suitable privacy policy dialog box 1100. In general, this privacy policy dialog 1100 provides users with notice of the privacy practices of a website in a display area 1102. Note that this provides a human-readable form of a site's privacy policies, which are generally maintained in an eXtensible Markup Language (XML) format. More particularly, when the user selects a site from the Privacy Report dialog 1000 (FIG. 10) and chooses to view its privacy summary, the privacy summary dialog 1100 renders that site's P3P Privacy Policy by means of an Extensible Stylesheet Language (XSL) Stylesheet that transforms the full XML formatted P3P policy into human readable form. Particular P3P values (XML elements) are mapped to particular user friendly strings or the like to display meaningful text to the user. The XSL style-sheet may be stored as a resource in the internet transport component 210 (e.g., wininet.dll), and a database or the like can contain the strings, wherein the language of the corresponding string may be selected to match that of the user based on the user's previously indicated language preference.

In addition to showing the strings, the internet transport component 210 attempts to retrieve a Verbose P3P XML privacy policy from one of three places: 1) the root of the domain (e.g., http://www.foo.com/p3p.xml); 2) from a location listed in a policy reference section of the web page's http header; or 3) from a location listed in a policy reference section of a LINK tag in the webpage. If retrieved, the Verbose P3P XML privacy policy may be displayed, such as by clicking on a link 1104.

The privacy policy dialog box 1100 also provides a user interface location where the user can make a choice about cookie handling for the selected site. To this end, radio buttons 1106 provide mutually exclusive choices as represented in FIG. 11. To preserve the user selections, if the user changes the radio-button options from the default (Compare cookies' Privacy Policy to my settings) and does not cancel the selection, the site's domain is recorded to a per-user section of the registry or other database, whereby the internet transport component 210 (e.g., wininet) will handle cookies specifically from that site in accordance with the settings. A cancel button 1108, along with an OK button 1110 and close [X] button 1112 are provided to control the settings and the display. Note that opening the privacy policy dialog box 1100 does not close the privacy report dialog 1000, and thus when the privacy policy dialog box 1100 is closed, the privacy report dialog 1000 is still presented to the user.

Turning to an explanation of the privacy settings user interface dialog 1200, as generally represented in FIG. 12, in general, the settings dialog 1200 simplifies the many possible privacy settings options, to allow even less-than-experienced users the ability to customize their privacy settings. While providing this ability, the privacy settings dialog 1200 also attempts to explain the impact of any changes to users in simple and clear terms.

As described above, the user can obtain access to the privacy settings dialog 1200 by actuating the Settings button 812 from the initial privacy warning dialog 800 (FIG. 8), or by actuating the Settings button 1014 of the privacy report dialog 1000 (FIG. 10). In one implementation, the user can also obtain access to the privacy settings dialog 1200 by selecting the "Tools" drop down menu from the browser toolbar line, selecting "Internet Options . . . " from the drop down menu, and clicking the "Privacy" tab 1202. Thus, the privacy settings user interface dialog 1200 is the same user interface as the Internet options . . . . Privacy tab selection.

In accordance with one aspect of the present invention, once the privacy settings dialog 1200 is presented to the user, high level access to the privacy customization functions is available. In keeping with the general theme of avoiding unnecessary complexity, a simplified control is provided at a top level in the form of a slider control 1204. The slider control 1204 automatically selects pre-loaded criteria (default settings) at a selected privacy level to prevent the user from having to make each of the many individual privacy decisions. For example, the slider simplifies the tens of thousands of possible settings and combinations to choosing one of six levels.

The slider bar 1204 enables the straightforward selection of one of a number of privacy levels, each level providing default privacy settings corresponding to cookie-handling of the various types of cookies. Text next to the control reflects the level of rules selected, and provides a brief description of that level's cookie handling actions. This text is updated as the user moves the slider control 1204. In one implementation, to change the per-level settings for the user in the system, if the user moves the slider bar 1204 and then clicks the "Apply" button 1206 or "OK" button 1208, a batch of rules for the currently selected level are read from a browser-specific location in the system registry or other browser database, and written to the user's registry or the like as that user's privacy rules. A "Cancel" button 1210 is also provided to allow the user to exit the privacy settings dialog 1200 without saving changes.

Levels include "Accept all cookies," "Low," "Medium," "Medium High," "High," and "No Cookies" (block all cookies), with "Medium" as the default level. Other levels such as "Medium Low" are possible, such as set forth in the example table described below. An example of a "Low" setting may be one that accepts all cookies, replays all cookies including Legacy Cookies, and wherein the per-site list (described below) does not override such rules. The tables below set forth example descriptions for other possible levels of default privacy settings:

| High | | |
|---|---|---|
| | First party context | Third party context |
| Persistent cookie No Compact Policy | Deny | Deny |
| Persistent cookie Unsatisfactory | Deny - also deny if the policy purposes | Deny - also deny if the policy purposes |

| High (continued) | | |
|---|---|---|
| | First party context | Third party context |
| Cookie | or recipients above have an opt-out attribute. | or recipients above have an opt-out attribute. |
| Persistent cookie with other policies | Accept | Accept |
| Session Cookies | Treat same as persistent | Treat same as persistent |
| Legacy Cookies | Leash | leash |
| Per site list overrides? | Yes | Yes |

Note that the notion of what makes a cookie "unsatisfactory" is somewhat strengthened for first and third parties in the High setting by also denying cookies with policies that use an 'opt-out' attribute.

| Medium High | | |
|---|---|---|
| | First party context | Third party context |
| Persistent cookie No Compact Policy | Leash | Deny |
| Persistent cookie Unsatisfactory Cookie | Deny | Deny - also deny if the policy purposes or recipients above have the opt-out attribute. |
| Persistent cookie with other policies | Accept | Accept |
| Session Cookies | Accept | Treat same as persistent |
| Legacy Cookies | Leash | leash |
| Per site List overrides? | Yes | Yes |

Note that the notion of unsatisfactory is somewhat strengthened for Third parties in Medium High by also denying cookies with policies that use the 'opt-out' attribute.

| Medium - Default Setting | | |
|---|---|---|
| | First party context | Third party context |
| Persistent cookie No Compact Policy | Leash | Deny |
| Persistent cookie Unsatisfactory Cookie | Downgrade | Deny |
| Persistent cookie with other policies | Accept | Accept |
| Session Cookies | Accept | Treat same as persistent |
| Legacy Cookies | Leash | Leash |
| Per Site list overrides? | Yes | Yes |

| Medium Low | | |
|---|---|---|
| | First party context | Third party context |
| Persistent cookie No Compact Policy | Leash | Downgrade |
| Persistent cookie Unsatisfactory Cookie | Accept | Downgrade |
| Persistent cookie with other policies | Accept | Accept |
| Session Cookies | Accept | Treat same as persistent |
| Legacy Cookies | Leash | Leash |
| Per site list overrides? | Yes | Yes |

The following table sets forth example settings for deleting a cookie in the medium settings:

| Cookie Delete in Medium | | | |
|---|---|---|---|
| | | First | Third |
| Leashed | Change value | Typical P3P eval | Typical P3P eval |
| Leashed | Delete | Always allowed invariant of CP (compact policy) | No Delete |
| Legacy leashed | Delete | Always allowed invariant of CP | Always allowed invariant of CP |
| Unleashed | Change value | Typical P3P eval | Typical P3P eval |
| Unleashed | Delete | Always allowed invariant of CP | Always allowed invariant of CP |

Delete of legacy leashed cookies is allowed from the third party context invariant of compact policy.

The privacy settings dialog allows these various default settings to be individually changed, via an "Advanced" button 1212 that takes a user to an advanced privacy settings dialog 1300, described below with respect to FIG. 13. Privacy settings can also be imported via an "Import" button 1214, as described below. Any privacy settings (rules) which do not match the defaults (templates) for the slider levels result in the slider being hidden and the text reading as "custom" settings with descriptive text that indicates custom user settings.

However, when any customized changes are made, including by moving the slider bar 1204 from its default level of medium, the privacy settings dialog 1200 enables a "Default" button 1216. When enabled and actuated, the Default button 1210 restores any customized privacy settings browser to the default privacy settings corresponding to the slider bar's Medium level, re-displays the slider bar 1204 and accompanying descriptive text at the Medium level, and disables (grays out) the Default button. In one implementation, to accomplish the settings restoration in the system, if the user clicks the Default button 1216, and (without making later changes) thereafter clicks the "Apply" button 1206 or "OK" button 1208, the batch of rules for the Medium level are read from a location in the registry and written to the user's registry as that user's privacy rules. For efficiency, rewriting may be deemed unnecessary when the user starts at the Medium level, varies from it, but has not yet accept (by the Apply button 1206 or OK button 1208) before actuating the Default button 1216 to restore the settings. This is because until changes that vary from the medium level are accepted, the Medium level settings remain in the user's appropriate registry location, and thus need not actually be restored.

Figure 13:
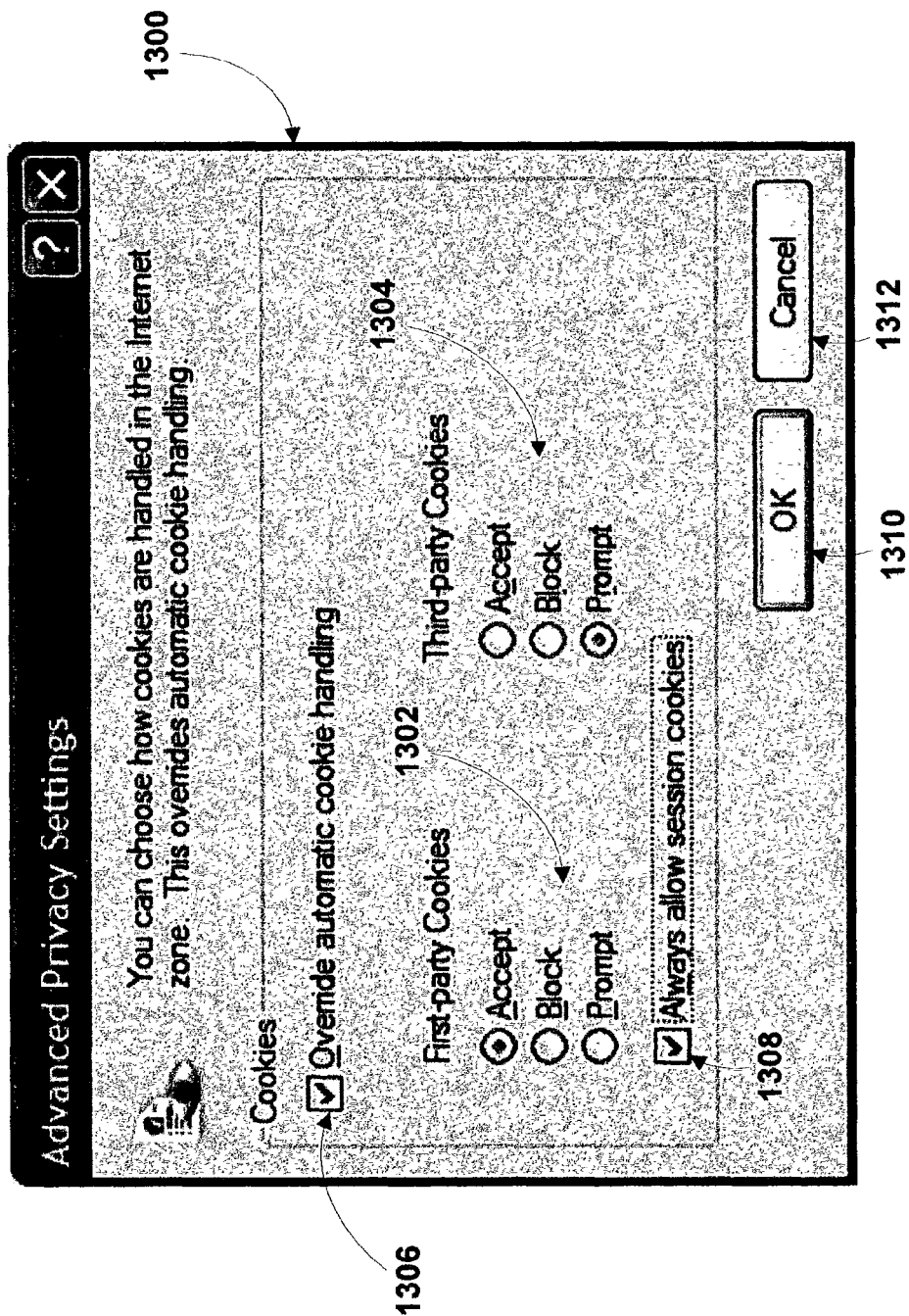
FIG. 13 is a representation of an example advanced settings user interface dialog provided to a user when the user selects an advanced settings option from the privacy settings user interface of FIG. 12.

FIG. 13 provides a representation of a suitable advanced privacy settings dialog 1300, which appears when the user clicks on the Advanced button 1212. Advanced settings enable the user to control first and third party cookies explicitly, and to treat session cookies as special cases.

When the advanced privacy settings dialog 1300 is selected, as represented in FIG. 13, the user is presented with advanced options in the form of radio buttons 1302 and 1304 corresponding to handling rules for first and third party cookies, respectively. To enable these radio buttons, an "Override" checkbox 1306 needs to be checked, wherein the Override checkbox informs the user that the user is actually overriding automatic cookie handling.

An "Always allow session cookies" checkbox 1308 is also provided to give the user more flexibility in cookie handling choices. Note that since session cookies only last for a single instance of browser execution, session cookies cannot easily be used to build a record of a user's browsing habits. Consequently, via the checkbox 1308, users can choose to allow session cookies, regardless of the first or third party context of the cookies and the corresponding settings of the first and third party radio buttons 1302 and 1304.

Figure 15A:
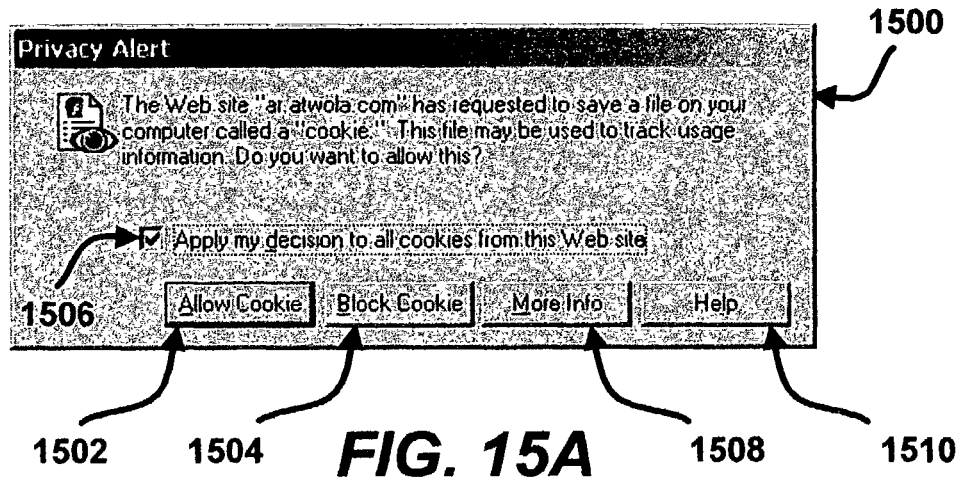
FIG. 15A is a representation of a privacy prompt that appears upon detecting certain types of cookies as specified by a user in the advanced options dialog of FIG. 13.

One of the radio buttons for first and third party cookies is for receiving a Prompt dialog 1500 (FIG. 15A) whenever a certain type (first or third party, non-session) of cookie is detected. As described above, a prompt allows a user to selectively control each cookie, before it is set by a site.

Once the user sets the advanced setting to prompt, each time thereafter that that type of cookie is served, the cookie prompt appears when a cookie is sent to the server with an HTTP request. In one implementation, the internet transport component 210 detects the type of cookie, reads the user's privacy rule from the user's registry indicating that the system should prompt on this type of cookie, and fires the prompt dialog 1500 dialog to decide on writing the cookie.

The prompt dialog 1500 provides an "Allow Cookie" button 1502 and "Block Cookie" button 1504, which provides the user with very granular control over which cookies are being sent and which are suppressed. The user's preference can be recorded in the registry via a checkbox 1506 so that the user's decision is remembered.

Figure 15B:
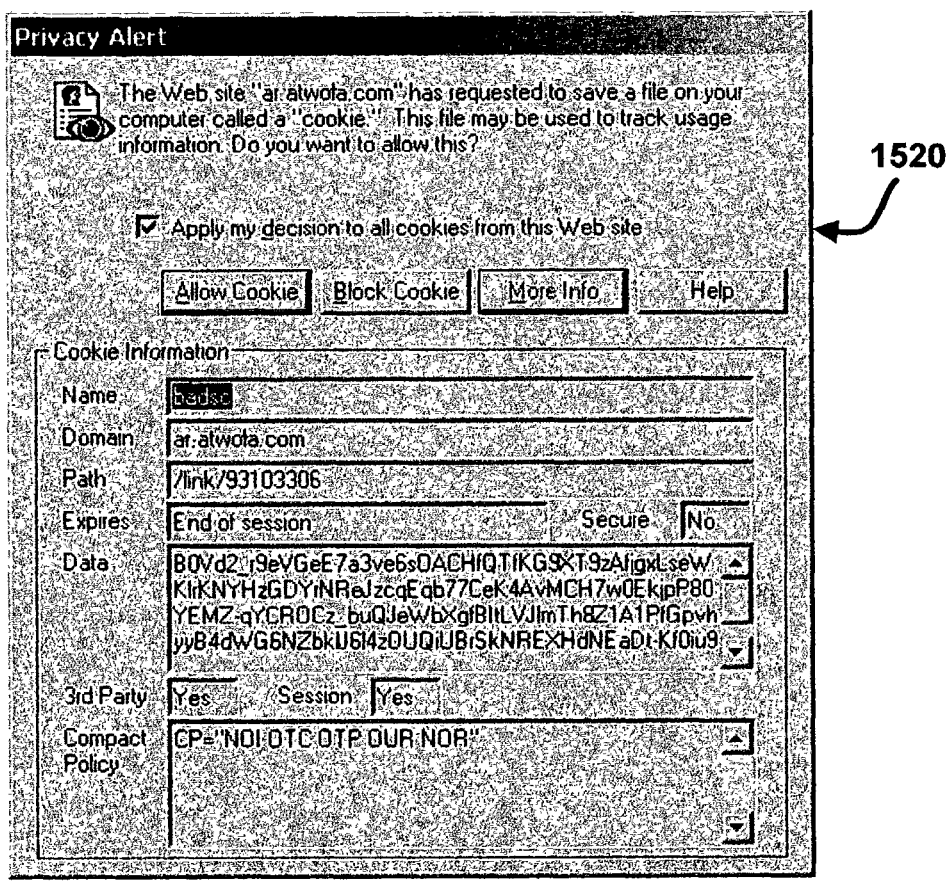
FIG. 15B is a representation of an expanded privacy prompt that appears when a user requests more information when presented with the prompt of FIG. 15A.

A "Help" button 1508 is also provided, to take the user to a help screen or the like that explains privacy. The "More Info" button 1510 expands the dialog 1500 into an expanded dialog 1520, as shown in FIG. 15B, and shows the contents of the cookie waiting to be written by the transport component, the intended expiration date of the cookie as well as the compact privacy policy tokens (contained in the HTTP header of the set cookie request) in their raw form.

Returning to FIG. 12, the privacy settings dialog 1200 also provides an "Edit" button 1218 in a "Web Sites" area 1220. The Edit button 1218 provides viewing and editing access to a per-site list, wherein cookie handling may be overridden for individual web sites. In one implementation, the browser records preferences for particular sites to as part of the user's privacy rules in the registry, whereby the internet transport component 210 can appropriately handle cookies from those sites as described above.

Figure 14:
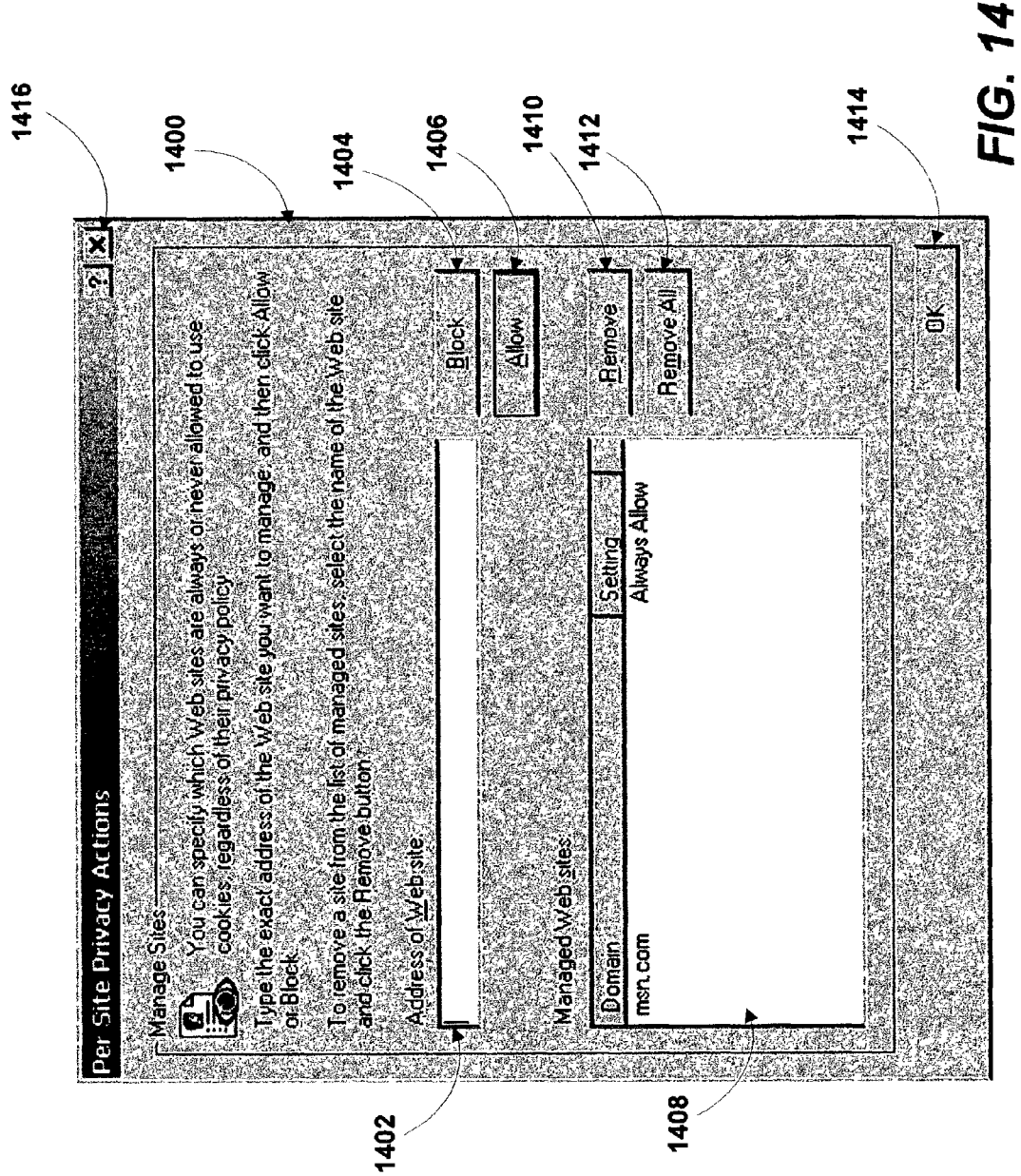
FIG. 14 is a representation of a per-site user interface dialog provided to a user when the user selects a web site edit option from the privacy settings user interface of FIG. 12.

In general, when the user clicks the "Edit" button 1218, the list of sites which have special rules for how cookies are handled outside of the P3P Rules or advanced settings is displayed. More particularly, as represented in FIG. 14, when selected, a per-site privacy actions dialog 1400 is presented to the user. The per-site dialog 1400 provides a typing area 1402 for entering the address of a web site, and when a site is entered, a "Block" button 1404 and "Allow" button 1406 enable the user, to specify whether to block or allow cookies from the domain corresponding to that site. When the Block button 1404 or Allow button 1406 is clicked, the site's domain is entered into a displayed list area 1408, which also displays the blocked or allowed status setting for that domain. Although only the domain and setting information is shown in FIG. 14, it is understood that other information may also be displayed. The list may have sites removed from it by a "Remove All" button 1412, or by individually removing selected sites (e.g., selected via a left click) by clicking a "Remove" button 1416. The per-site dialog 1400 is closed in a conventional manner, via an OK button 1414 or via the close window [X] button 1416.

Returning to FIG. 12, for more advanced users, the privacy settings dialog of FIG. 12 allows users to import settings, via the Import button 1214. The importing of preferences for handling of cookies may be based on a list of sites, or specific privacy practices (e.g., as defined by the P3P standard). To this end, when the user clicks the import button 1214, the user is prompted (not shown) for the location of a privacy settings file. The user chooses a file in a conventional manner, and receives a simple confirmation dialog when the file is successfully imported.

In one implementation, the internet transport component 210 (e.g., wininet.dll) provides an API that accepts well-formed Privacy setting XML files and records the described settings as the user's privacy rules in the registry. More particularly, an ImportPrivacySettings function is provided to process and import an Extensible Markup Language (XML) file that contains the customized privacy preferences, such as using the XML elements defined below:

| XML Element | Definition |
| --- | --- |
| alwaysReplayLegacy | Specifies to always replay legacy cookies. |
| if_policy_cookieaction | Specifies a rule describing how to act on a cookie based on its compact policy |
| firstparty | Specifies rules for first-party cookies. |
| flushCookies | Specifies that all cookies be deleted when custom settings are loaded. |
| flushSiteList | Specifies that the privacy per-site list be deleted when custom settings are loaded. |
| MSIEPrivacy | Specifies custom privacy settings. |
| MSIEPrivacySettings | Specifies custom privacy settings as a function of security zone, Web page context (first-party vs. third-party), type (session vs. persistent cookie) and the content of a cookie's Platform for Privacy Preferences (P3P) compact policy. |
| MSIESiteRules | Specifies privacy per-site rules for cookies. |
| p3pCookiePolicy | Specifies how to handle cookies based on the P3P compact policy. |
| site | Specifies the per-site rules for a Web site. |
| thirdparty | Specifies rules for third-party cookies. |

Preferences that exist in the registry may also be exported to an XML file for applying those settings to another computer. In one implementation, an application program or the like may use a Privacy settings export API to generate the settings file with the current privacy preferences for that install of the browser. To this end, the Export API reads the settings from the registry, and maps those back to XML formatted privacy settings.

Figure 16:
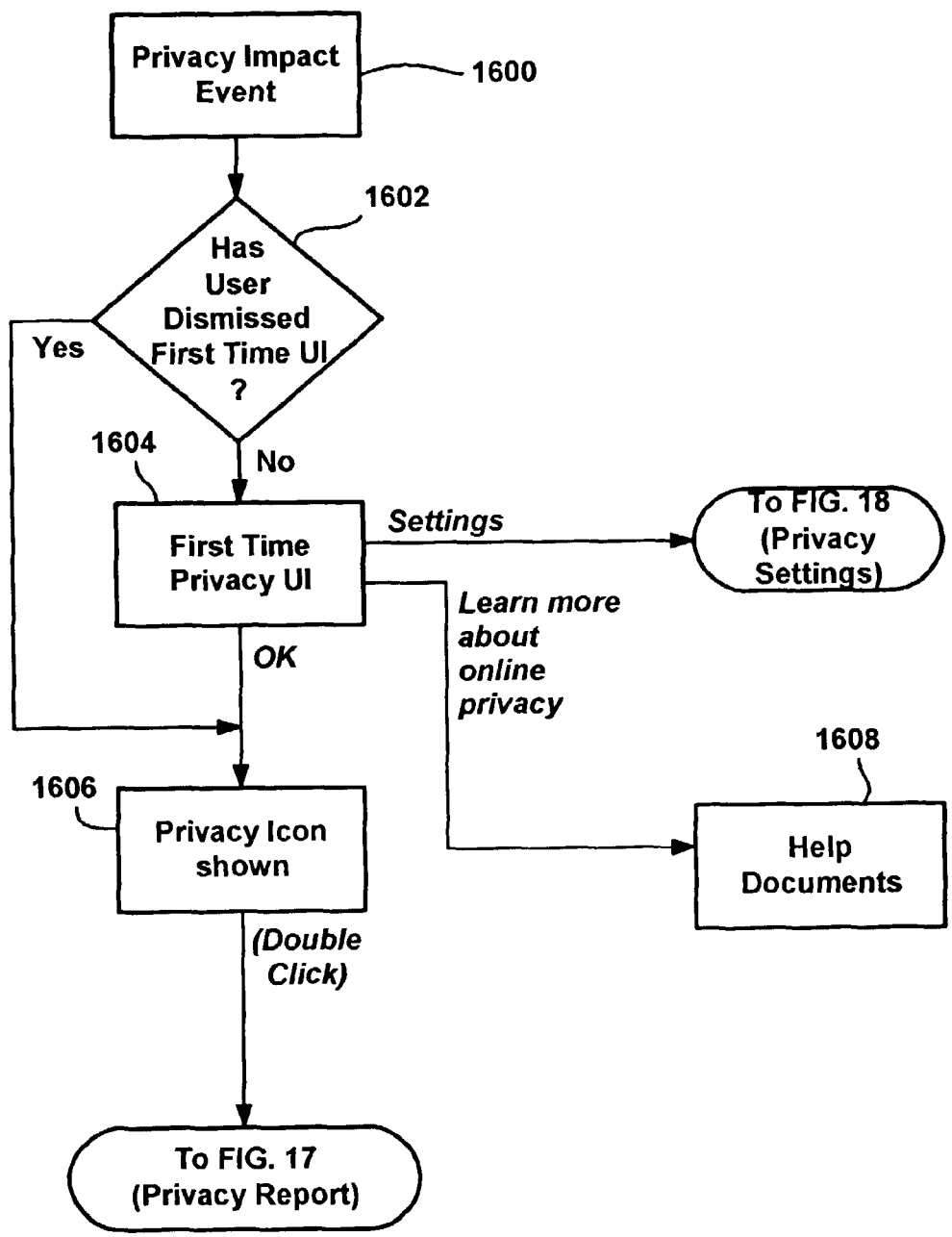
FIGS. 16-18 generally comprise a flow diagram explaining the various states of operation and the relationship between the user interface components of FIGS. 8-14.

Turning to an explanation of the operation of the present invention, and by way of summary, FIG. 16 generally shows the operation of the browser components beginning at step 1600 when a privacy impact event is received. Step 1602 tests whether the first time privacy user interface 800 (FIG. 8) has been dismissed by the user, that is, whether it had been previously displayed to the user and the user had requested via checkbox 806 that the first time privacy user interface 800 not be shown again. If not dismissed, the process branches to step 1604 to present the user with the first time privacy user interface 800, otherwise step 1602 skips the display thereof by branching ahead to step 1606, which represents the display of the privacy icon 900 (FIG. 9).

As described above, when the user is presented with the first time privacy user interface 800 (step 1604), the user can exit it, whereby step 1606 represents the displaying of the privacy icon. Alternatively, the user can request help, as represented by step 1608, or can select the Settings button 812, which will take the user to the privacy settings dialog 1200, described below with reference to FIG. 18.

Figure 17:
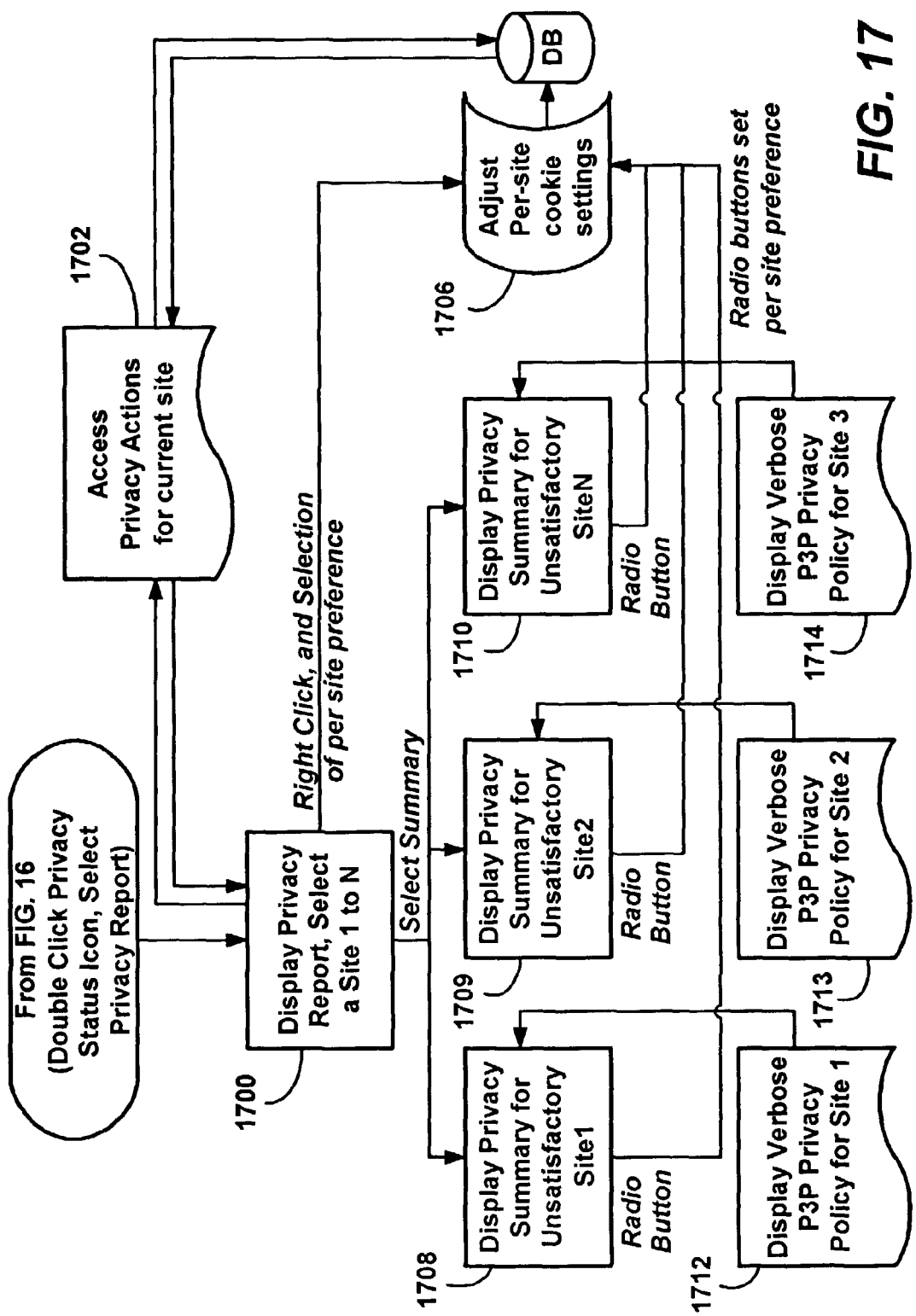

FIG. 17 generally represents the privacy report dialog 1000 that appears when the user selects (double-clicks) the privacy icon 900 at step 1606. Step 1700 represents the displaying of the privacy report 1000, which may include accessing privacy actions for the current site at step 1702, from the per-site database 304 (FIG. 3), such as in the user's registry. As described above, the user can right click a listed site and select a preference (e.g., via the pop-up display 1020 of FIG. 10) for handling cookies from that site. The preference is then stored (step 1706) for that user's per-site preference settings, such as in the per-site database 304.

A user may also select any listed site (represented as Site1-SiteN) and elect to view that site's summary, as represented by steps 1708-1710, which may include displaying the verbose policy for that site, as represented by respective steps 1712-1714. With the display of the summary (e.g., 1100 of FIG. 11), the user is presented with radio buttons (e.g., 1106 in FIG. 11) to control cookie-handling of the selected site. The radio button settings are stored (step 1706) in the appropriate user's per-site database 304.

Figure 18:
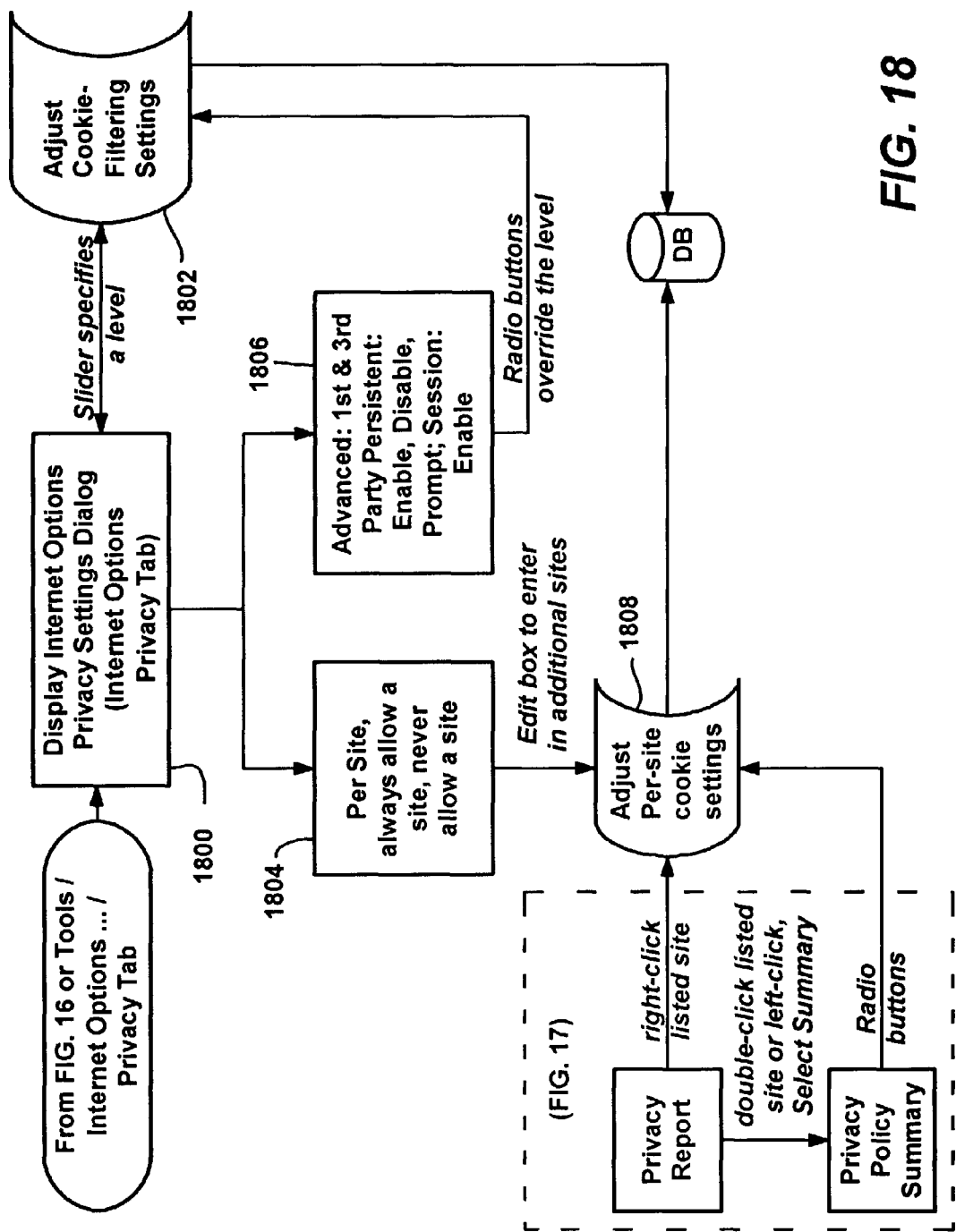

FIG. 18 generally represents some of the operations corresponding to the privacy settings dialog 1200 of FIG. 12, beginning at step 1800 where the dialog is displayed. As described above with reference to FIG. 12, a user can use a slider bar 1204 (if it is currently appearing) to select among default levels of settings, as represented by step 1802 which accesses the privacy preferences store 310 (e.g., the appropriate registry locations for the user's privacy settings) to read and write the settings as needed.

As also described above, the user can edit per site selections via an Edit button, labeled 1218 in FIG. 12, which corresponds to step 1804. Step 1804 allows the user to edit sites via step 1808, which adjusts the per-site cookie settings in the per-site database 304. Note that step 1808 is essentially the same as step 1706 described above, as generally represented by part of FIG. 17 (indicated by the surrounding dashed box) being reproduced in FIG. 18.

A user can also used the advanced button 1212 for controlling first and third party cookies, which corresponds to step 1806 in FIG. 18. As described above, the advanced button enables the overriding of default settings, by writing the changes via step 1802 into the preferences store 310.

As can be seen from the foregoing detailed description, users greatly benefit in privacy from the ability to control the operations on cookies on their computers in a manner that is efficient, flexible and intuitive, yet handles the considerable variety of cookie types and sources. The present invention handles cookie-related privacy issues for users of any level of sophistication.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method comprising:
   displaying a privacy settings user interface that provides at least:
      a first set of selection options for first party cookie handling;
      a second set of selection options for third party cookie handling, the first set of selection options and the second set of selection options each including at least an accept selection option, a block selection option, and a prompt selection option; and
      a session cookie handling selection option;
   receiving input to configure the first set of selection options, the second set of selection options, and the session cookie handling selection option;
   receiving a response to a client request for content of a remote server during a browsing session by the client, the response including data directed to a requested operation on a cookie;
   determining whether the cookie is a first-party cookie or a third-party cookie;
   determining whether the cookie is a persistent cookie or a session cookie;
   determining a privacy result based on whether the cookie is a first party cookie or a third party cookie and whether the cookie is a persistent cookie or a session cookie based on the configuration of the first set of selection options, the second set of selection options, and the session cookie handling selection option;
   if the privacy result indicates the requested operation on the cookie should be blocked, blocking the requested operation on the cookie and displaying an interactive user interface component from which privacy-related actions may be selected; and wherein:
   the interactive user interface component comprises a status icon that, when actuated, comprises a mechanism that provides privacy policy data related to the response comprising a privacy report that includes a list identifying at least one site that had a requested cookie operation that was blocked.

2. The method of claim 1 wherein the privacy report lists only sites having blocked cookie-related operations, and further comprising, providing a mechanism to change the list to view one or more sites that provided content for the response.

3. The method of claim 2 wherein the one or more sites include all sites that provided content for the response, independent of any handling of cookie-related operations for those sites.

4. The method of claim 1 wherein each site on the list may have a cookie-handling option specified therefor by interaction with the privacy report.

5. The method of claim 1, further comprising the step of deriving a privacy result that indicates the requested operation on the cookie should be blocked if no privacy policy data is associated with the cookie.

6. The method of claim 1 wherein each site on the list may be selected by interaction with the privacy report.

7. The method of claim 6 further comprising, detecting selection of a listed site, and providing a privacy summary for that site.

8. The method of claim 7 wherein providing a privacy summary comprises displaying information corresponding to compact policy data provided with the response data associated with the selected site.

9. The method of claim 1 wherein the interactive user interface component from which privacy-related actions may be selected includes a mechanism for changing the criteria used in evaluating privacy policy data, and further comprising, detecting selection of the mechanism, and in response, providing a privacy settings user interface component.

10. The method of claim 9 wherein the privacy settings user interface component includes a mechanism that enables a user to interactively select one level of default privacy settings from among a plurality of levels.

11. One or more computer storage media, having computer-executable instructions stored thereon, the instructions configured to:
   display a privacy settings user interface that provides at least:
      a first set of selection options for first party cookie handling;
      a second set of selection options for third party cookie handling, the first set of selection options and the second set of selection options each including at least an accept selection option, a block selection option, and a prompt selection option; and
      a session cookie handling selection option;
   receive input to configure the first set of selection options, the second set of selection options, and the session cookie handling selection option;
   receive a response to a client request for content of a remote server during a browsing session by the client, the response including data directed to a requested operation on a cookie;
   determine whether the cookie is a first-party cookie or a third-party cookie;
   determine whether the cookie is a persistent cookie or a session cookie;
   determine a privacy result based on whether the cookie is a first party cookie or a third party cookie and whether the cookie is a persistent cookie or a session cookie based on the configuration of the first set of selection options, the second set of selection options, and the session cookie handling selection option; and
   if the privacy result indicates the requested operation on the cookie should be blocked, block the requested operation on the cookie and display an interactive user interface component from which privacy-related actions may be selected.

12. The one or more computer storage media of claim 11 wherein the privacy result is set to indicate the requested operation on the cookie should be blocked if no privacy data is present with the response.

13. The one or more computer storage media of claim 11 wherein the interactive user interface component lists one or more sites that provided content for the response.

14. The one or more computer storage media of claim 13, wherein the user interface component identifies any site that had a requested cookie operation blocked.

* * * * *